US012653095B1

(12) United States Patent　(10) Patent No.:　US 12,653,095 B1

Richardson et al.　(45) Date of Patent:　Jun. 16, 2026

(54) ELECTRIC MOTOR WITH INTEGRATED SELF-SUPPORTING SPINDLE FOR A MOWER

(71) Applicant: Parker-Hannifin Corporation, Cleveland, OH (US)

(72) Inventors: Jason S. Richardson, Chuckey, TN (US); Kenneth Daryl Edwards, Seymour, TN (US)

(73) Assignee: Parker Hannifin Corporation, Cleveland, OH (US)

( * ) Notice: Subject to any disclaimer, the term of this patent is extended or adjusted under 35 U.S.C. 154(b) by 440 days.

(21) Appl. No.: 18/331,368

(22) Filed: Jun. 8, 2023

Related U.S. Application Data

(60) Provisional application No. 63/417,136, filed on Oct. 18, 2022, provisional application No. 63/358,662, filed on Jul. 6, 2022.

(51) Int. Cl.
| | |
|---|---|
| *A01D 34/82* | (2006.01) |
| *A01D 34/66* | (2006.01) |
| *H02K 5/22* | (2006.01) |
| *H02K 7/08* | (2006.01) |
| *H02K 9/22* | (2006.01) |
| *A01D 101/00* | (2006.01) |

(52) U.S. Cl.
CPC ........... *A01D 34/66* (2013.01); *A01D 34/828* (2013.01); *H02K 5/225* (2013.01); *H02K 7/083* (2013.01); *H02K 9/22* (2013.01); *A01D 2101/00* (2013.01)

(58) Field of Classification Search
CPC ... A01D 34/66; A01D 34/828; A01D 2101/00
See application file for complete search history.

(56) References Cited

U.S. PATENT DOCUMENTS

| | | | |
|---|---|---|---|
| 3,500,620 A | 3/1970 | Duran et al. | |
| 3,596,446 A * | 8/1971 | Bryan | A01D 34/6806 |
| | | | 464/39 |
| 5,293,731 A * | 3/1994 | Thomas | F16D 59/02 |
| | | | 56/DIG. 4 |

(Continued)

FOREIGN PATENT DOCUMENTS

| | | | | |
|---|---|---|---|---|
| AU | 2020100204 A4 * | 3/2020 | ............. | A01D 34/82 |
| CN | 203086293 U | 7/2013 | | |

(Continued)

OTHER PUBLICATIONS

"FAQ" (including "What is a Belleville Washer?"), American Belleville web site, retrieved on Oct. 9, 2025 from https://americanbelleville.com/faq/ (Year: 2025).*

*Primary Examiner* — Claude J Brown
(74) *Attorney, Agent, or Firm* — McDonnell Boehnen Hulbert & Berghoff LLP

(57) ABSTRACT

An example assembly includes a housing having a motor housing portion and a spindle housing portion, wherein the spindle housing portion comprises a central tube; an electric motor disposed within the motor housing portion of the housing, wherein the electric motor has a rotor; a spindle coupled to the rotor of the electric motor, wherein the spindle is disposed within the central tube of the spindle housing portion; one or more bearings disposed within the central tube and supporting the spindle.

17 Claims, 17 Drawing Sheets

(56)                    References Cited

U.S. PATENT DOCUMENTS

| | | | | |
|---|---|---|---|---|
| 8,227,948 B1 * | 7/2012 | Fox | ........................ | H02K 1/06 |
| | | | | 310/88 |
| 8,615,976 B1 * | 12/2013 | Hauser | ................ | H02K 7/1085 |
| | | | | 56/10.8 |
| 9,560,800 B2 * | 2/2017 | Reichen | ............... | A01D 34/733 |
| 10,862,376 B2 | 12/2020 | Kouda et al. | | |
| 11,211,844 B1 * | 12/2021 | Bonny | ................ | H02K 11/215 |
| 11,346,439 B1 * | 5/2022 | Langenfeld | .......... | F16H 57/082 |
| 2018/0338420 A1 * | 11/2018 | Manji | ................... | A01D 34/661 |
| 2020/0112227 A1 | 4/2020 | Kouda et al. | | |
| 2020/0113133 A1 | 4/2020 | Zeiler et al. | | |
| 2021/0105939 A1 | 4/2021 | Zeiler et al. | | |

FOREIGN PATENT DOCUMENTS

| | | | | |
|---|---|---|---|---|
| WO | WO-2005122362 A1 * | 12/2005 | ........... | H02K 15/023 |
| WO | WO-2021071652 A1 * | 4/2021 | ............. | A01D 69/02 |

* cited by examiner

ELECTRIC MOTOR WITH INTEGRATED SELF-SUPPORTING SPINDLE FOR A MOWER

CROSS REFERENCE TO RELATED APPLICATION

The present application claims priority to U.S. Provisional Application No. 63/358,662 filed on Jul. 6, 2022 and U.S. Provisional Application No. 63/417,136 filed on Oct. 18, 2022, the entire contents of all of which are herein incorporated by reference as if fully set forth in this description.

TECHNICAL FIELD

This disclosure relates to an electric motor of a work function (e.g., cutting blade of a mowing deck) having an integrated self-supporting spindle for a mower.

BACKGROUND

The turf market is transitioning zero-turn-radius (ZTR) mowers from hydrostatic ground drive and belt driven mower decks to electric drives for all functions. It may thus be desirable to have an electric motor configuration that reduces cost given limitations of the turf market. It may also be desirable to configure the electric motor in a manner that facilitates integration of electric motors into ZTR mower applications. It is with respect to these and other considerations that the disclosure made herein is presented.

SUMMARY

The present disclosure describes implementations that relate to an electric motor with integrated self-supporting spindle for mower.

In a first example implementation, the present disclosure describes an assembly. The assembly includes: a housing having a motor housing portion and a spindle housing portion, wherein the spindle housing portion comprises a central tube; an electric motor disposed within the motor housing portion of the housing, wherein the electric motor has a rotor; a spindle coupled to the rotor of the electric motor, wherein the spindle is disposed within the central tube of the spindle housing portion; and one or more bearings disposed within the central tube and supporting the spindle.

In a second example implementation, the present disclosure describes a mower. The mower includes a source of electric power; a mower deck; and one or more assemblies mounted to the mower deck and coupled to respective blades, wherein an assembly of the one or more assemblies comprises the assembly of the first example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 9A illustrates a top view of a blade adapter, in accordance with an example implementation.

FIG. 9B illustrates a side view of the blade adapter of FIG. 9A, in accordance with an example implementation.

FIG. 10A illustrates a top view of a blade adapter driver, in accordance with an example implementation.

FIG. 10B illustrates a side view of the blade adapter driver of FIG. 10A, in accordance with an example implementation.

DETAILED DESCRIPTION

Disclose herein are systems and assemblies of an integrated motor and spindle configuration that reduces cost.

The disclosed systems and assemblies may also facilitate integration of an electric motor into ZTR mower applications, enhance heat rejection from the electric motor, allow for a compact packaging of the electric motor and spindle, enhance efficiency of the electric motor, and allow for variable blade heights of a blade of a mowing deck to accommodate multiple applications. The disclosed assemblies may also protect the electric motor against sudden stops of a blade coupled to the electric motor.

Figure 1:
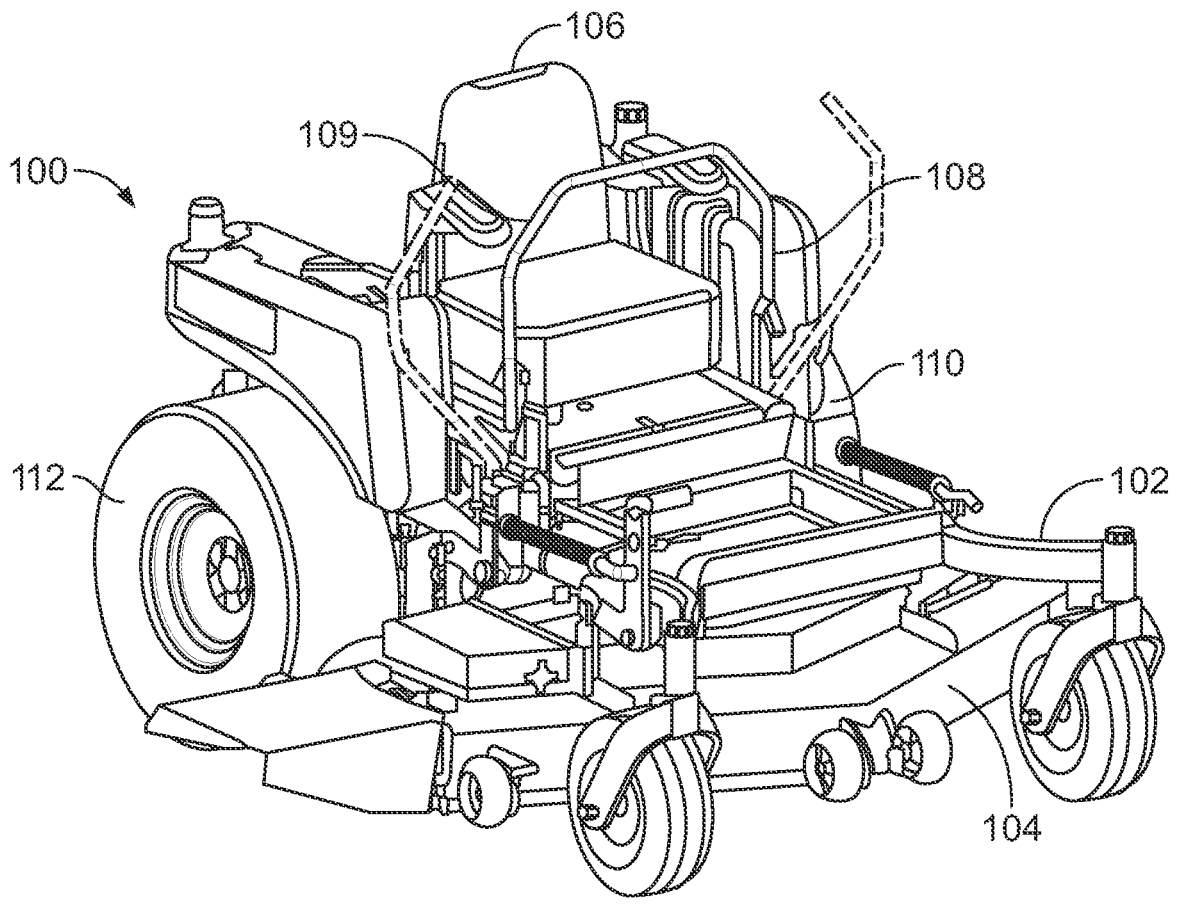
FIG. 1 illustrates a perspective view of a mower, in accordance with an example implementation.

FIG. 1 illustrates a perspective view of a mower 100, in accordance with an example implementation. The mower 100 can be, for example, zero-turn-radius (ZTR) mower (e.g., a lawn mower with a turning radius that is effectively zero).

The mower 100 includes a frame 102. The mower 100 also includes a mower deck 104 supported by the frame 102. The mower deck 104 can house one or more blades (not shown in FIG. 1; see blade 208 in FIGS. 2B-2C) for mowing grass, for example. The mower 100 further includes an operator seat 106 and steering control levers 108, 109 for operating the mower 100.

In examples, a rear mounted engine (not shown) can be mounted to the frame 102 behind the operator seat 106. The engine can be an internal combustion engine configured to provide power to a power generator. The power generator then provides electric power to one or more electric motors that drive respective rear wheels such as left wheel 110 and right wheel 112 that drive the mower 100, for example. The power generator can also provide power to one or more electric motors that drive the blades of the mower deck 104. In another example, rather than using an engine and a power generator, the mower 100 can be a battery-driven vehicle, where a rechargeable battery provides electric power to drive the various electric motors. As such, the mower 100 has a source of electric power (e.g., a power generator or a battery) for driving electric motors.

The steering control levers 108, 109 can be configured to control speed and direction of the wheels 110, 112 via actuating the respective electric motors. Thus, the drive system can be controlled by an operator to drive the wheels 110, 112 independently and propel the mower 100. The configuration of the mower 100 is an example configuration. It should be understood that the disclosed systems and assemblies described below could be used in other mower configurations and other vehicle types in addition to mowers.

Figure 2A:
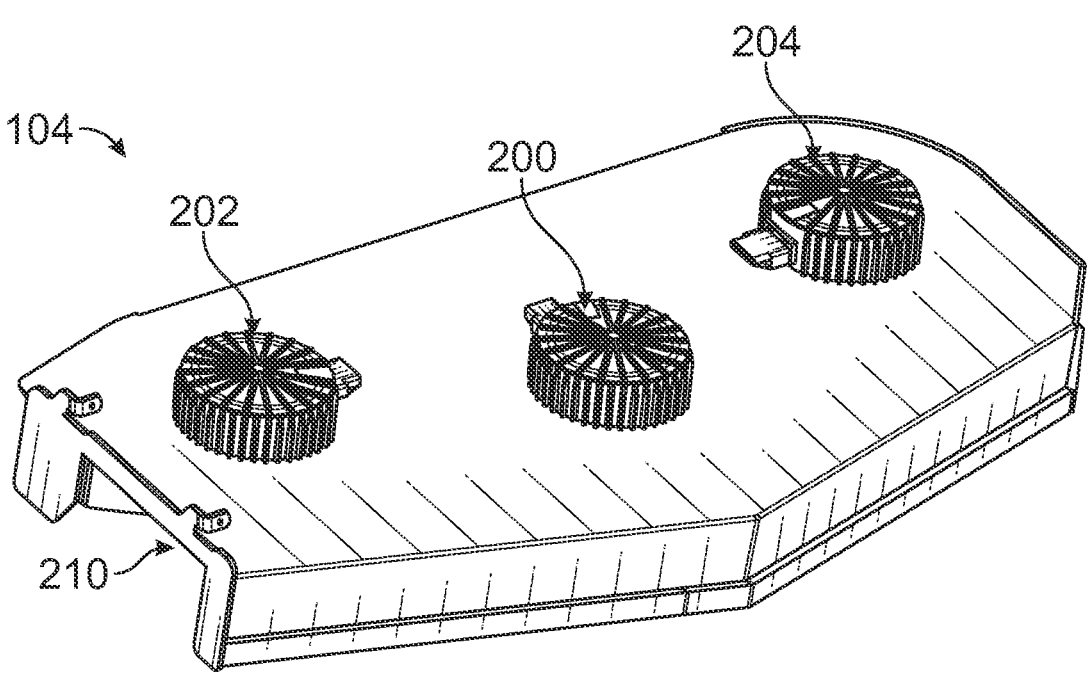
FIG. 2A illustrates a perspective view of a mower deck with electric motor assemblies driving blades of the mower deck, in accordance with an example implementation.
Figure 2B:
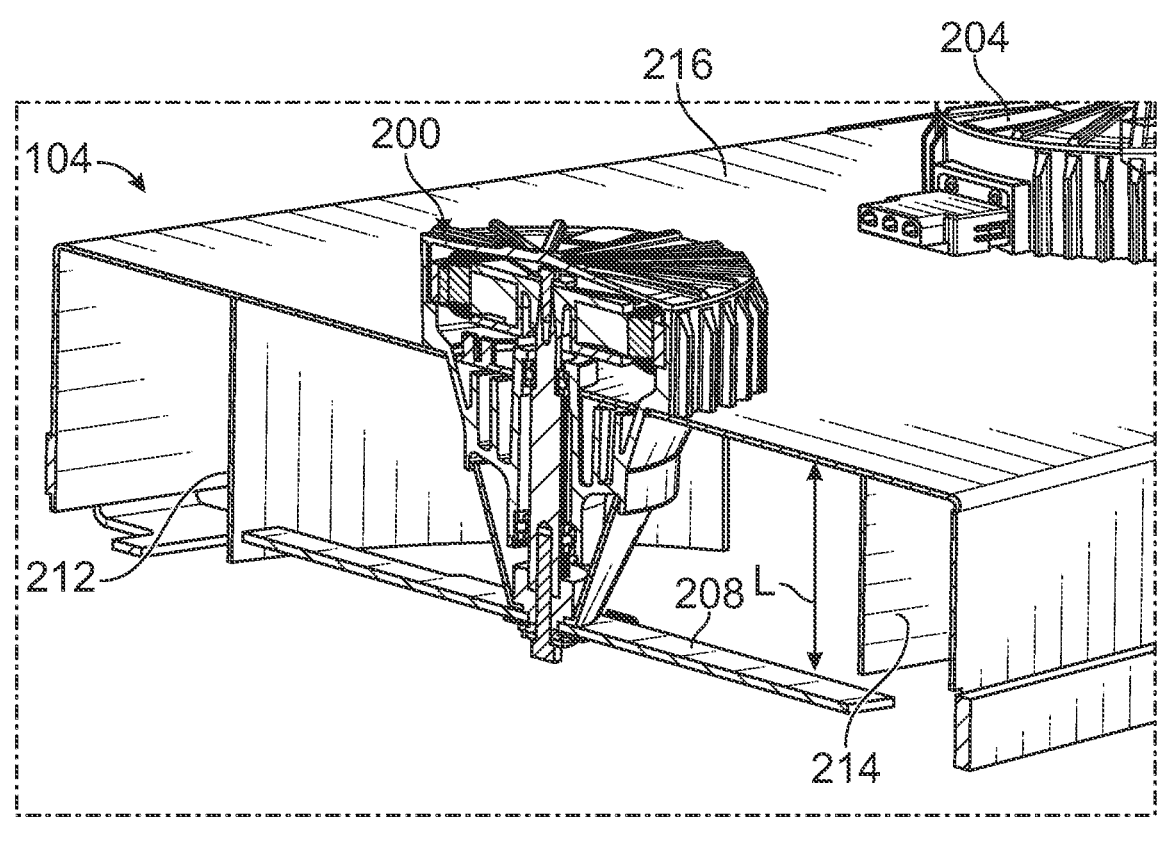
FIG. 2B illustrates a perspective cross-sectional view of the mower deck of FIG. 2A, in accordance with an example implementation.
Figure 2C:
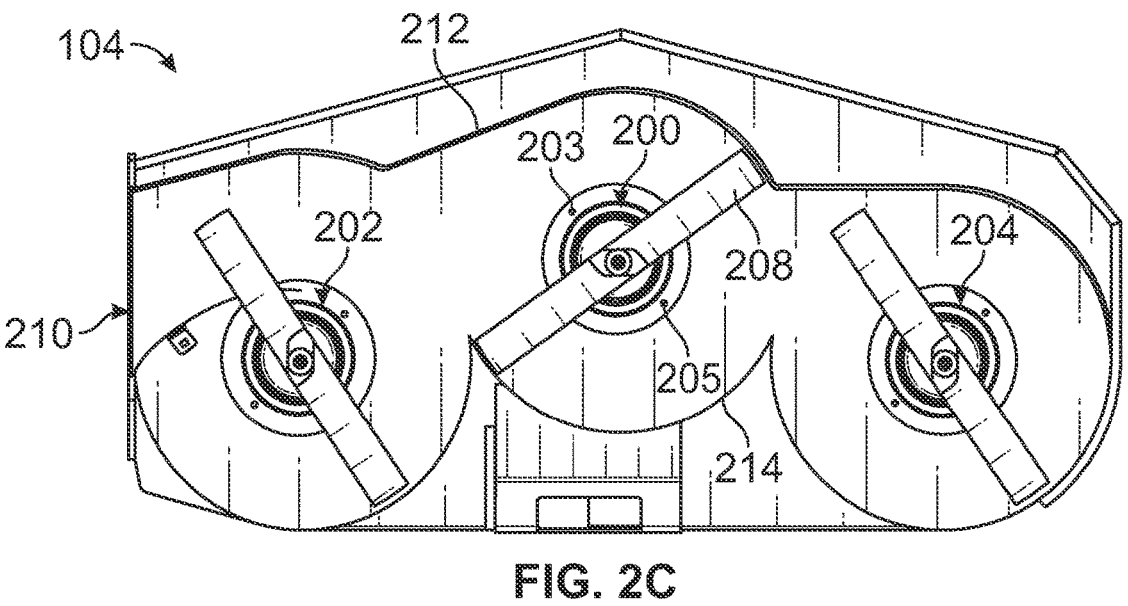
FIG. 2C a bottom view of the mower deck of FIG. 2A, in accordance with an example implementation.

FIG. 2A illustrates a perspective view of the mower deck 104 with electric motor assemblies driving blades of the mower deck 104, FIG. 2B illustrates a perspective cross-sectional view of the mower deck 104, and FIG. 2C illustrates a bottom view of the mower deck 104, in accordance with an example implementation. The mower deck 104 can be made of sheet metal for example, and may include a plurality of electric motor assemblies such as assembly 200, assembly 202, and assembly 204. Each assembly of the assemblies 200, 202, 204 includes a respective electric motor with an integrated spindle configured to drive a respective blade of the mower deck 104. Although three assemblies are shown, in other example implementations, more or fewer electric motor assemblies and blades could be used.

The assemblies 200, 202, 204 can be coupled to the mower deck 104 via fasteners (bolts, screws, etc.). For example, as shown in FIG. 2C, the assembly 200 is coupled to the mower deck 104 via a bolt 203 and bolt 205.

Referring to FIG. 2C, each of the assemblies 200-204 can be coupled to and is configured to drive a blade for cutting grass. For example, the assembly 200 is coupled to a blade 208 for cutting grass. Referring to FIGS. 2B-2C, the mower deck 104 has an outlet 210 for discharging grass that is cut by the blades of the mower deck 104. The mower deck 104 can include baffles such as baffle 212 and baffle 214 that are curved to streamline air flow and direct cut grass to the outlet 210 for discharge from the mower deck 104.

Mowers can be characterized by their depth of cutting. The depth of cutting can be defined, for example, as the distance "L" labelled in FIG. 2B from the bottom of the blade 208 to a bottom surface of a top plate 216 (e.g., ceiling of the underside of the top plate 216) of the mower deck. The distance L can vary based on the type of mower. For example, the distance L can be between 4 inches and 7.5 inches based on the type of mower. It may be desirable for the assemblies 200, 202, 204 to be configured to adjust the position of the blades (e.g., the blade 208) to accommodate different types of mowers.

Figure 3A:
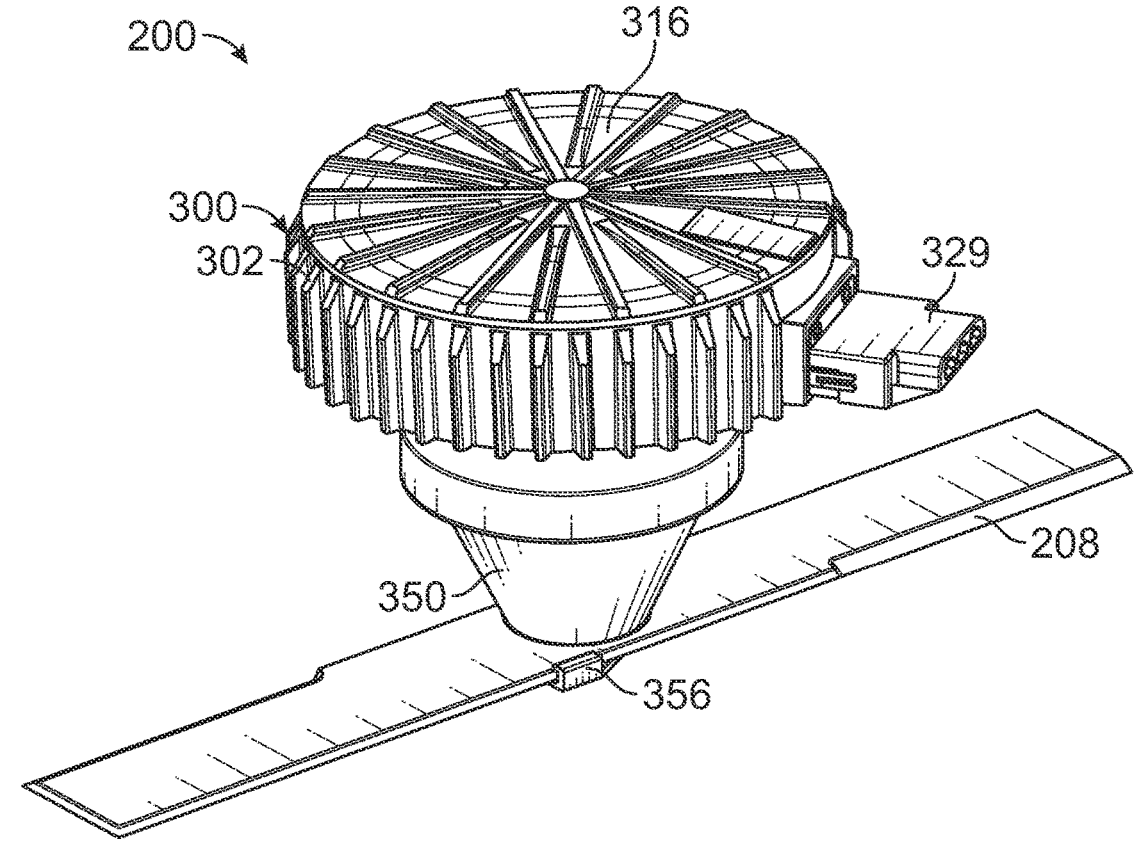
FIG. 3A illustrates a perspective view of an assembly with a blade of a mower coupled thereto, in accordance with an example implementation.
Figure 3B:
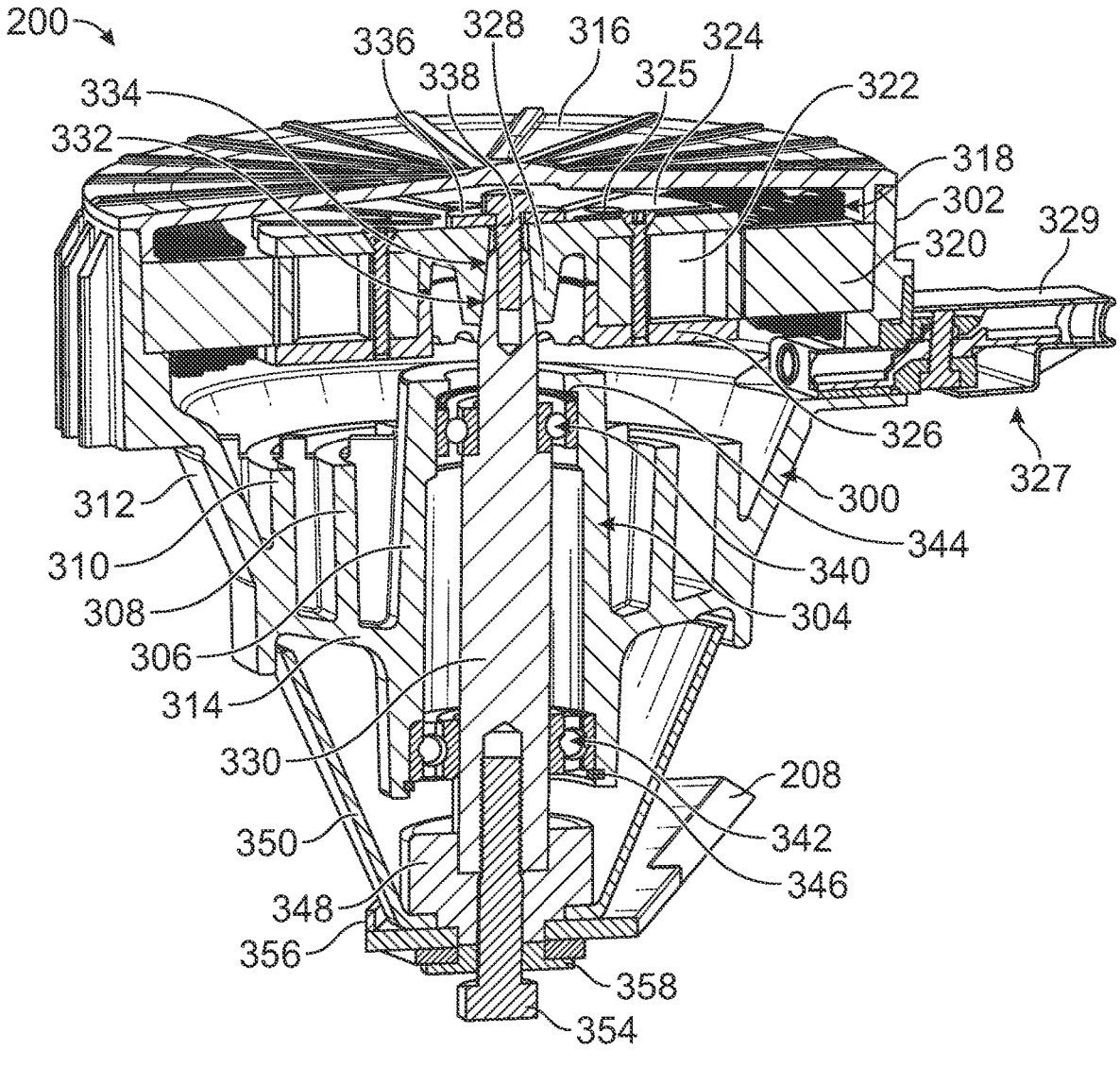
FIG. 3B illustrates a perspective cross-sectional view of the assembly of FIG. 3A, in accordance with an example implementation.
Figure 3C:
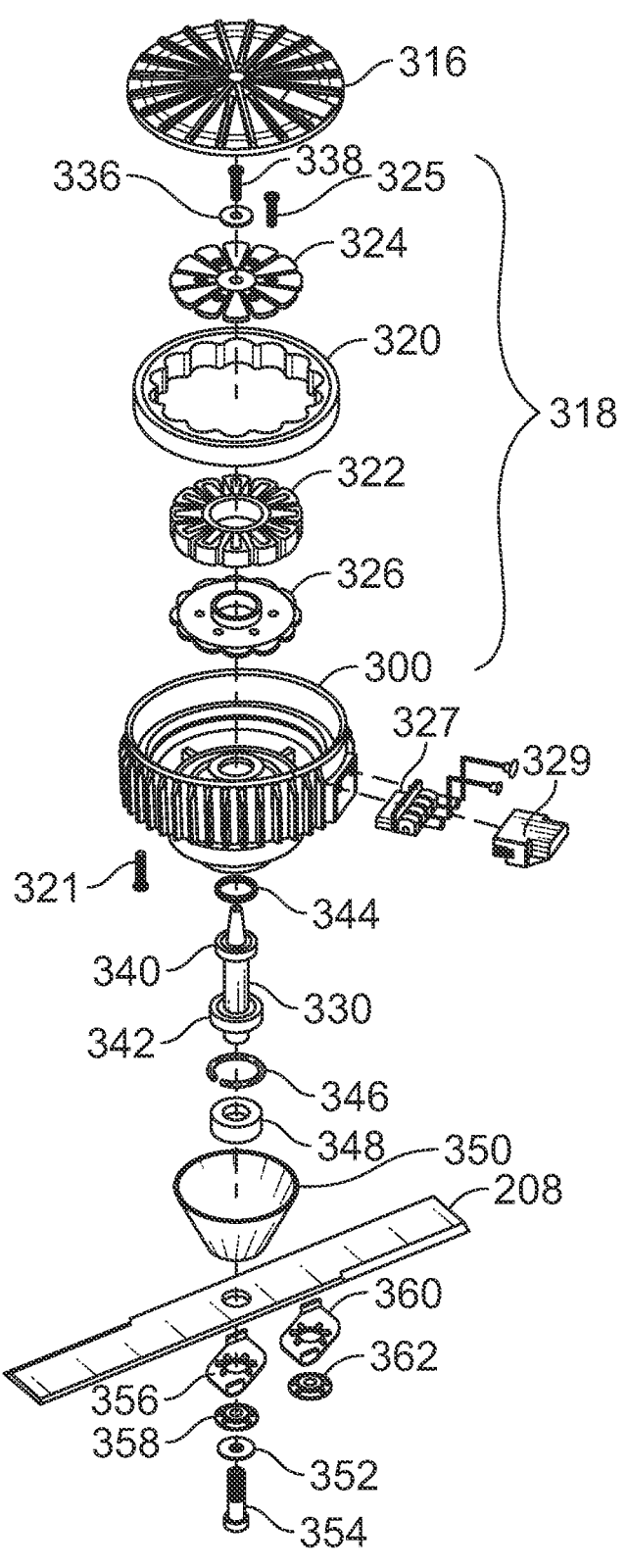
FIG. 3C illustrates an exploded view of the assembly of FIG. 3A, in accordance with an example implementation.

FIG. 3A illustrates a perspective view of the assembly 200 with the blade 208 coupled thereto, FIG. 3B illustrates a perspective cross-sectional view of the assembly 200, and FIG. 3C illustrates an exploded view of the assembly 200, in accordance with an example implementation. FIGS. 3A-3C are described together.

The assembly 200 has a housing 300. The bolts 203, 205 shown in FIG. 2C can couple the housing 300 to the top plate 216 of the mower deck 104 to attach the assembly 200 to the mower deck 104. As shown in FIG. 3B, the housing 300 includes a motor housing portion 302 (upper housing portion) and a spindle housing portion 304 integrated together to form the housing 300.

The spindle housing portion 304 has a central tube 306 disposed within the housing 300. In an example, the housing 300 can further include internal rings or cylindrical portions such as cylindrical portion 308 and cylindrical portion 310 with webs therebetween. The cylindrical portions 308, 310 are concentric such that the cylindrical portion 308 is internal to the cylindrical portion 310.

In the example implementation of FIGS. 3A-3B, the housing 300 has a tapered or conical section 312 and conical section 314 that connect the motor housing portion 302 to the spindle housing portion 304. The assembly 200 further includes a lid or housing cover 316, thereby forming an enclosure having an internal chamber therein.

The assembly 200 includes an electric motor 318 mounted within the enclosure formed by the housing 300 and the housing cover 316. The electric motor 318 includes a stator 320 fixedly-positioned within the motor housing portion 302. As shown in FIG. 3C, the assembly 200 includes fasteners 321 that couple the stator 320 to the housing 300 and the housing cover 316. The fasteners 321 are disposed in a circular array about the housing 300 and the stator 320. The fasteners 321 are also configured as anti-rotation features that preclude rotation of the stator 320 within the housing 300.

The electric motor 318 further includes a rotor 322 disposed within the stator 320. The rotor 322 is sandwiched or interposed between an upper rotor clamping plate 324 and a lower rotor clamping plate 326. As depicted in FIG. 3B, the upper rotor clamping plate 324 has a hub 328 having an internal taper. Screws such as screw 325 can be used to couple the upper rotor clamping plate 324, the rotor 322, and the lower rotor clamping plate 326 to each other. The screw 325 can be a flat head screw, for example.

In one example, a controller of the electric motor 318 (including an inverter) may be disposed external to the assembly 200. The controller may provide three-phase, alternating current (AC) electric power to coils of the stator 320 via terminals of a terminal block assembly 327 mounted through the housing 300.

In another example, as described below with respect to FIGS. 5A-5D, the inverter may be disposed within the assembly 200. In this example, a direct current (DC) electric power and a control signal is provided to the inverter via the terminal block assembly 327, and the inverter generates the AC electric power to drive the coils of the stator 320. The assembly 200 can include a terminal block cover 329 to protect the terminal block assembly 327.

The assembly 200 further includes a spindle 330 coupled to the hub 328 of the upper rotor clamping plate 324. The spindle 330 has a tapered upper end 332 that is received within, and complies to, the internal taper of the hub 328. The tapered upper end 332 and the internal taper of the hub 328 form a self-holding taper arrangement 334. The self-holding taper arrangement 334 involves a shallow taper angle, such that the tapered upper end 332 and the hub 328 are wedged to each other firmly. With this configuration, torque can be transmitted from the hub 328 of the rotor 322 to the spindle 330 without a locking device. This self-holding taper arrangement 334 provides for self-aligning of the spindle 330 with the hub 328, and may preclude any backlash that might be characteristic of other coupling mechanisms. However, in other examples, other mechanisms can be used for torque transmission such as a spline arrangement, a key-keyway-key seat arrangement, etc.

A washer 336 and a screw 338 (e.g., a hex head screw) couple the upper rotor clamping plate 324 to the spindle 330. However, the washer 336 and the screw 338 might not be needed for torque transmission from the hub 328 to the spindle 330 due to the self-holding taper arrangement 334.

As the rotor 322 rotates, torque is generated at the spindle 330. The spindle 330 is supported by one or more bearings comprising, for example, an upper bearing 340 mounted at an upper end of the spindle 330 within the central tube 306, and a lower bearing 342 mounted at a lower end of the spindle 330 within the central tube 306. The bearings 340, 342 facilitate rotation of the spindle 330 relative to the housing 300.

In an example, a wave spring 344 can be mounted atop the upper bearing 340. The inner race of the upper bearing 340 can be mounted between a shoulder formed in the central tube 306 and a shoulder formed in the spindle 330. The wave spring 344 presses against the outer race of the upper bearing 340.

During assembly, the wave spring 344, the spindle 330, and the bearings 340, 342 can be inserted from the bottom of the housing 300. A retaining ring 346 can then be inserted to interface with the lower bearing 342 and retain the spindle assembly (i.e., the wave spring 344, the spindle 330, and the bearings 340, 342) within the central tube 306. During operation, the wave spring 344 applies a biasing force on the upper bearing 340, and thus on the spindle 330 and the lower bearing 342, against the retaining ring 346. This way, the wave spring 344 can maintain tightness of the spindle assembly, and reduce noise and vibration.

Advantageously, if any of the components of the spindle assembly deteriorates over time (e.g., one of the bearings 340, 342 fails), performing maintenance of the spindle assembly without having to replace the entire assembly is possible. The spindle assembly can be removed from the bottom, the bearings 340, 342, or other components can be changed, and the spindle assembly can be re-inserted into the central tube 306.

At the lower end of the spindle 330, the assembly 200 includes a mounting spacer 348. As described below, the mounting spacer 348 can be configured as a variable blade adapter to facilitate mounting the blade 208 at different heights.

The assembly 200 further includes an airflow cone 350 that is mounted about a portion of the spindle housing portion 304, and particularly about a portion of the central tube 306. The airflow cone 350 does not contact the housing 300 at the upper end of the airflow cone 350 (i.e., there is a gap between the upper end of the airflow cone 350 and the housing 300). The airflow cone 350 rotates with the blade 208 and the mounting spacer 348. The airflow cone 350 blocks debris and grass, and thus protects the bearings 340, 342.

Particularly, as the blade 208 rotates and cuts grass, the airflow cone 350 keeps the grass swirling and away from the spindle 330, allowing the grass to be directed by the baffles 212, 214 of the mower deck 104 toward the outlet 210. The conical smooth shape of the airflow cone 350 may preclude grass and debris from sticking to the assembly 200. Further, the airflow cone 350 can facilitate airflow to aid with cooling the assembly 200 during operation.

Figure 7A:
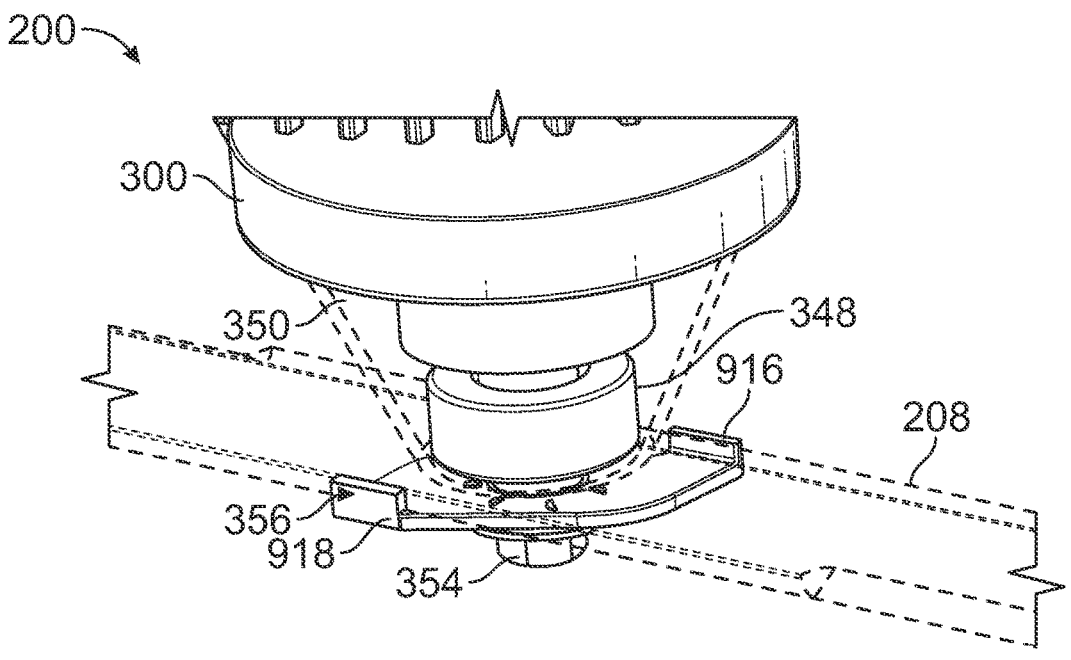
FIG. 7A illustrates a partial perspective view of the assembly of FIG. 3A depicting a bottom portion thereof, in accordance with an example implementation.
Figure 7B:
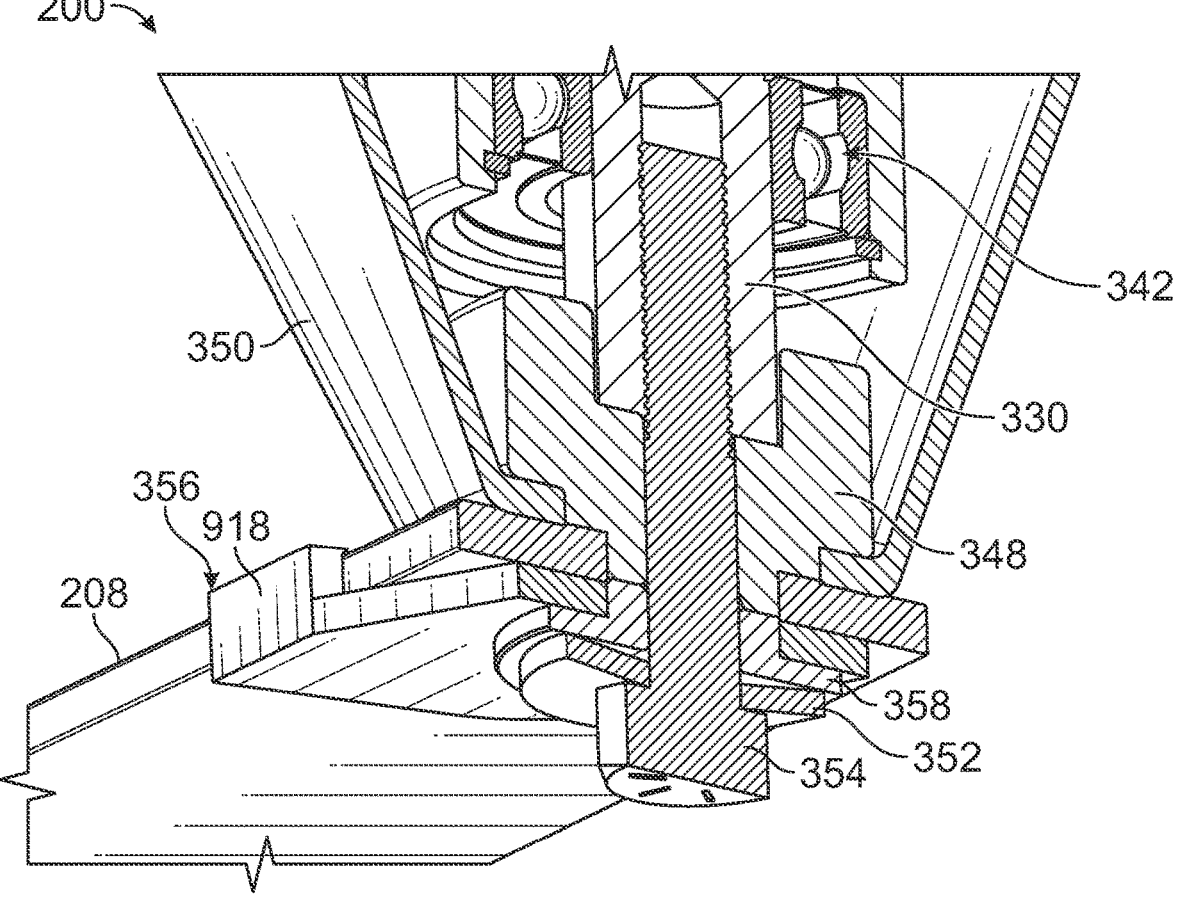
FIG. 7B illustrates a perspective cross-sectional view of a bottom portion of the assembly of FIG. 3A, in accordance with an example implementation.

The assembly 200 further includes a Bellville washer 352 and a screw 354 (e.g., a hex head screw) at the bottom end of the assembly 200 (see FIG. 3C and FIG. 7B). The screw 354 is threadedly engaged with the spindle 330 such that the screw 354 rotates with the spindle 330.

In an example, the screw 354 has right-handed threads and the electric motor 318 is configured such that the rotor 322 rotates in a clockwise direction from a top view perspective of the assembly 200. This way, as the rotor 322 rotates, it tends to tighten the screw 354 and keep it clamped to the Bellville washer 352.

In one example, the screw 354 and the Bellville washer 352 can facilitate transmitting torque from the spindle 330 to the blade 208. In this example, the Bellville washer 352 may interface directly with the blade 208 and clamps the blade 208 against the mounting spacer 348. As the spindle 330 rotates, the screw 354 and the Bellville washer 352 rotate therewith, thereby causing the blade 208 to rotate.

In some applications, the blade 208 may encounter a hard obstacle (e.g., a rock) during its rotation. In some instances, the hard obstacle may force the blade 208 to stop suddenly. Such sudden stoppage of the blade 208 may cause damage to the electric motor 318. In these applications, the assembly 200 can include a breakaway configuration that allows the rotor 322 to keep rotating as the blade 208 stops suddenly.

Particularly, the assembly 200 can include a blade adapter 356 and a blade adapter driver 358. The Bellville washer 352 is clamped against the blade adapter driver 358, and thus the blade adapter driver 358 rotates with the Bellville washer 352 and the spindle 330. The blade adapter driver 358 is also clamped against the mounting spacer 348, and thus causes the mounting to spacer 348 to rotate therewith.

Further, as described in detail below, the blade adapter driver 358 is coupled to the blade adapter 356 and is configured to rotate the blade adapter 356. The blade adapter 356 is turn has receptacles or channels that receive the blade 208 therein. With this configuration, the blade adapter 356 rotates the blade 208.

In one example, the blade adapter 356 can be made of plastic material, and the receptacles may break to allow the rotor 322 to continue rotating if the blade 208 hits an obstacle and stops rotating. In another example, an alternative blade adapter made of sheet metal such as blade adapter 360 shown in FIG. 3C can be used and its receptacle can bend as opposed to break when the blade 208 hits an obstacle. A corresponding blade adapter driver 362 can be used with the blade adapter 360.

The Bellville washer 352 (e.g., a conical spring washer, disc spring, or cupped spring washer) is configured as a conical shell, which can be loaded along its axis by the screw 354. The frusto-conical shape of the Bellville washer 352 imparts spring-like characteristics or compliance against the component with which it interfaces.

Figure 4A:
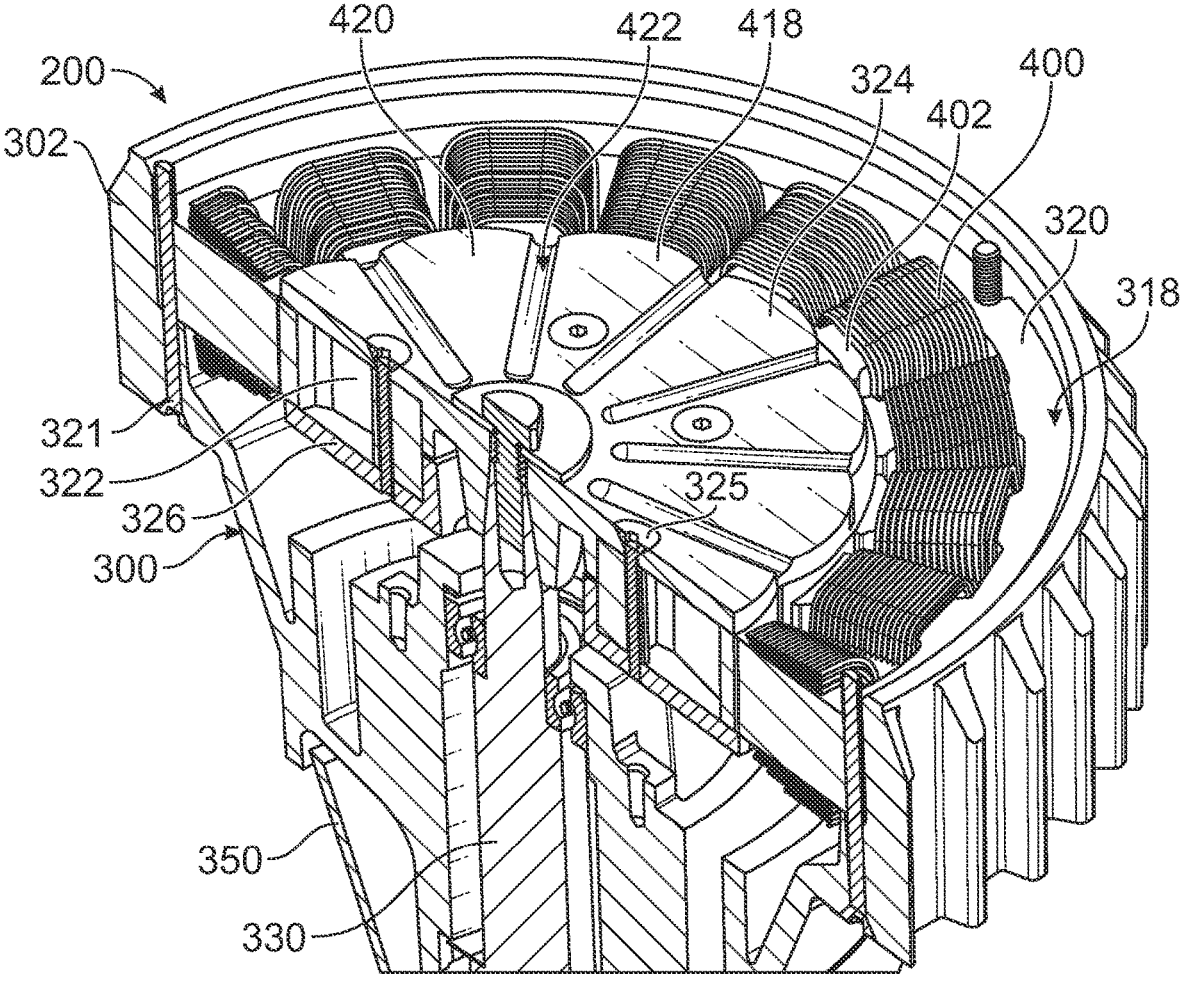
FIG. 4A illustrates a partial perspective view of the assembly of FIG. 3A, in accordance with an example implementation.

FIG. 4A illustrates a partial perspective view of the assembly 200, in accordance with an example implementation. FIG. 4A shows the assembly 200 without the housing cover 316 to show internal components of the assembly 200 including the electric motor 318.

The stator 320 comprises one or more stator lamination stacks. The stator 320 also includes a plurality of coils or wire windings, such as wire windings 400, wrapped about slots formed in the stator lamination stack. In the example implementation of FIG. 4A, the wire windings have a focused windings arrangement such that each individual coil has its own wire windings, i.e., there is one bundle of wire around each pole such as pole 402. When electric current is provided through the wire windings of the stator 320, a magnetic field is generated.

The stator 320 forms an annular space therein, and the rotor 322 is disposed within such annular space. The rotor 322 can have a rotor core that can include one or more rotor lamination stacks mounted between the upper rotor clamping plate 324 and the lower rotor clamping plate 326.

Figure 4B:
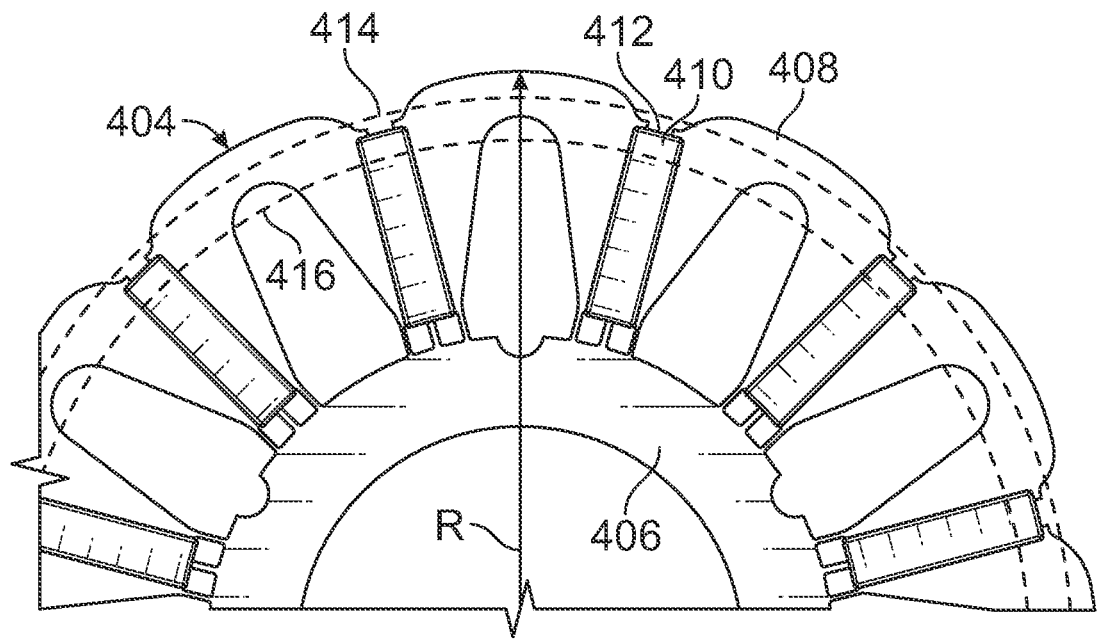
FIG. 4B illustrates a partial top view of a rotor lamination stack of a rotor, in accordance with an example implementation.

FIG. 4B illustrates a partial top view of a rotor lamination stack 404 of the rotor 322, in accordance with an example implementation. The rotor lamination stack 404 includes a plurality of laminations (e.g., thin metal sheets that are stacked together). As an example for illustration, the rotor lamination stack can be 25 millimeter (mm) in width and can include 50 laminations that are 0.5 mm thick each. In an example, a lamination may include a central ring 406 and a plurality of petals such as petal 408 that emanate radially outward from the central ring 406. The petals are disposed in a circular array around the central ring 406.

Magnets, such as magnet 410 can be disposed between the petals of the laminations. Such magnets are configured to interact with the magnetic field generated by the stator 320 in order to rotate the rotor 322 and produce torque at the spindle 330.

In the example implementation shown in the figures, the electric motor 318 is configured as a permanent magnet brushless DC three-phase motor. The magnets (e.g., the magnet 410) are arranged in a spoke configuration. Such configuration may provide enhanced power density and efficiency at a low cost of manufacturing, which may be desirable in a lawnmower. As an example for illustration, the electric motor 318 can be configured as a 12-pole, 18-slot, permanent magnet, brushless DC motor. However, other types of electric motors could be used.

In one example, the magnets can be embedded between the petals such that that the magnets extend radially-outward to within a particular range relative to a radius of the outer surface of the petals. For example, if the radius of the outer or exterior surface of the petals is "R" as labelled in FIG. 4B, a radially-outward end 412 of the magnet 410 is disposed between a first circle 414 that represents 90% of the radius R and a second circle 416 that represents 80% of the radius R. This configuration may reduce magnetic saliency, improve efficiency, and reduce torque ripple.

Referring back to FIG. 4A, the upper rotor clamping plate 324 is configured to have sectors, such as sector 418 and sector 420, shaped generally like the petals of the rotor 322. The sectors are separated by grooves such as groove 422 separating the sectors 418, 420.

During operation of the electric motor 318, it may be subjected to shock and vibration forces. Further, the rotor 322 can rotate at high speeds that can cause axial forces to be applied to the laminations. In particular, larger forces are applied to the petals compared to the central ring 406. For example, 20-30% of the axial forces may be applied to the central ring 406, whereas 70-80% of the force acts on the petals.

As such, under some operating conditions, the individual laminations of the rotor lamination stacks may separate from each other. In other examples, the petals may be coupled to the central ring 406 of the lamination via thin legs that may break. As a result, a petal may become loose or may flop.

A separate lamination or loose petal may cause damage to the assembly 200. For example, a petal may enter an air gap between the stator 320 and the rotor 322 and may cut through wire windings of the stator 320. As such, it may be desirable to preclude the laminations from separating from each other and/or preclude the petals from breaking or flopping.

The upper rotor clamping plate 324 and the lower rotor clamping plate 326 may facilitate retaining the laminations and preclude de-lamination or separation. Particularly, as the sectors of the upper rotor clamping plate 324 are shaped generally like the petals, and as the upper rotor clamping plate 324 extends to radially-outward tips of the petals, the upper rotor clamping plate 324 may enhance retaining the laminations of the rotor 322.

As mentioned above, screws (e.g., the screw 325) are used to couple the upper rotor clamping plate 324 to the lower rotor clamping plate 326 and retain the rotor 322 interposed therebetween. The screws are disposed in a circular array about the upper rotor clamping plate 324 as shown in FIG. 4A.

Further, the screws 325 are disposed through the sectors of the upper rotor clamping plate 324 between the magnets of the rotor 322. This way, the screws 325 are disposed at a magnetically-neutral position equidistant from two adjacent magnets. Further, in an example, the screws are positioned at or below the bottom ends of the magnets. As such, the screws can be made of steel without affecting the magnetic performance (e.g., may help prevent magnetic flux leakage) of the electric motor 318. Further, as described below, the grooves (e.g., the groove 422) may further facilitate cooling of the electric motor 318.

Figure 4C:
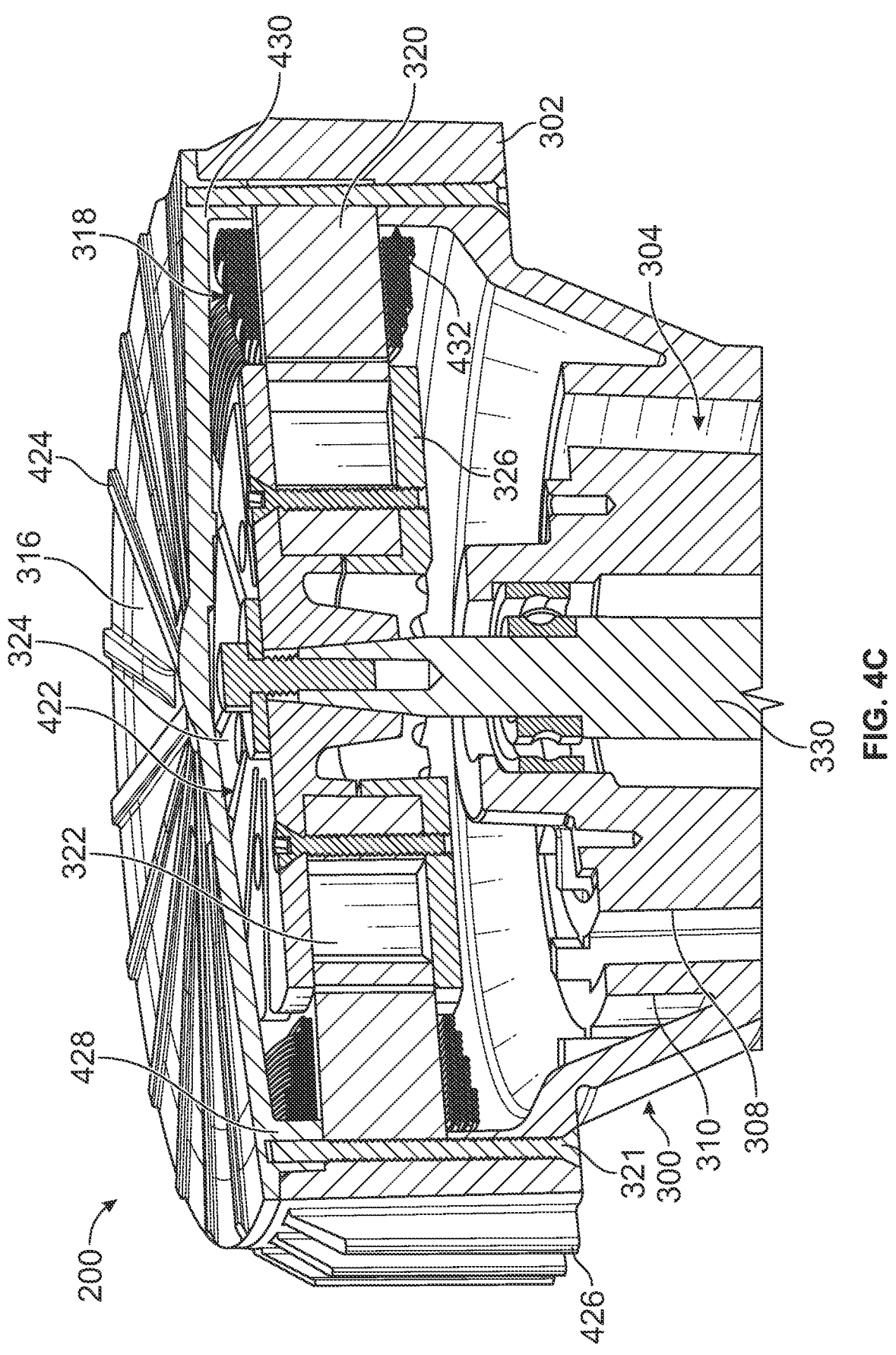
FIG. 4C illustrates another partial perspective view of the assembly of FIG. 3A, in accordance with an example implementation.

FIG. 4C illustrates a partial perspective view of the assembly 200, in accordance with an example implementation. As the electric motor 318 operates and electric current is provided to the wire windings and of the stator 320, heat is generated by the stator 320. The configuration of the assembly 200 may enhance heat transfer from the assembly 200 to its environment (e.g., to the atmosphere).

The housing 300, which integrates the motor housing portion 302 and the spindle housing portion 304, may enhance heat transfer or dissipation from the assembly 200. Particularly, the unitary construction of the housing 300 increases the surface area of the housing 300 from which heat can be dissipated. Rather than heat being rejected from a motor housing alone, heat is also dissipated from the entire surface area of the housing 300, which includes the spindle housing portion 304. This configuration may increase efficiency of heat rejection and may increase the efficiency and life of the electric motor 318.

In an example, the housing 300 and the housing cover 316 can be made of aluminum to enhance heat dissipation to the environment of the assembly 200. The housing cover 316 may have fins such as fin 424. The fins of the housing cover 316 are configured as radial fins emanating from the center of the housing cover 316 in a radially-outward direction. Similarly, the motor housing portion 302 may have respective fins such as fin 426. The fins of the motor housing portion 302 are configured in a circular array about an exterior surface of the motor housing portion 302.

Such fins of the housing cover 316 and the motor housing portion 302 may further increase the surface area from which heat is dissipated, and may thus enhance heat dissipation. Further, as the blade 208 rotates, it blows air toward the housing 300 to help dissipating heat from the housing 300 and the housing cover 316 and their respective fins. The fins of the housing cover 316 and the motor housing portion 302 are shallow to preclude grass and debris from sticking to the housing 300 or the housing cover 316.

Further, the housing 300 and the housing cover 316 are configured in a manner that facilitates heat transfer from the stator laminations to the housing 300 and the housing cover 316. In an example, the stator 320 can be slip fitted into the housing 300 such that the exterior peripheral surface of the stator 320 interfaces with the interior surface of the housing 300 and provide heat thereto. Such heat transfer is further enhanced by other features of the assembly 200.

Referring to FIGS. 4A and 4C together, the assembly 200 includes the fasteners 321 that couple the stator 320 to the housing cover 316 and the housing 300. The housing cover 316 includes arcuate portions that protrude downward toward the stator 320 such as arcuate protrusion 428 and arcuate protrusion 430 shown in FIG. 4C. The arcuate protrusions 428, 430 are arcuate as they extend in a curved manner around the edge of the housing cover 316.

As the fasteners 321 are screwed into the housing 300, the stator 320 and the housing cover 316, the fasteners 321 pull the housing cover 316 toward the stator 320 causing the arcuate protrusions 428, 430 to contact the stator 320. This way, heat can be transferred from the stator 320 to the housing cover 316.

Further, the housing 300 includes a shoulder 432 formed around the interior of the motor housing portion 302. The fasteners 321 pull the stator 320 against the shoulder 432 such that heat is transferred from the stator 320 to the housing 300, then dissipated to the environment of the assembly 200.

Further, as the rotor 322 and the upper rotor clamping plate 324 rotate, the grooves (e.g., the groove 422) of the upper rotor clamping plate 324 help circulate and move the air within the motor housing portion 302. This way, cooling the electric motor 318 may be enhanced.

The electric motor 318 is operated by a motor controller. Such motor controller may include one or more printed circuit boards (PCBs). A PCB mechanically supports and electrically connects electronic components (e.g., microprocessors, integrated chips (ICs), capacitors, resistors, etc.) using conductive tracks, pads, and other features etched from one or more sheet layers of copper laminated onto and/or between sheet layers of a non-conductive substrate. Components are generally soldered onto the PCB to both electrically connect and mechanically fasten them to it.

As an example, the motor controller can include a microprocessor and an inverter (e.g., an inverter PCB). The inverter can be configured as a power converter that converts DC power received at the inverter to three-phase, AC power that can be provided to wire windings of the stator 320 to drive the electric motor 318. The microprocessor provides a pulse width modulated (PWM) signal to operate the power converter of the inverter, for example.

As mentioned above, in one example, the motor controller of the electric motor 318 (including an inverter) may be disposed external to the assembly 200. In this example, the motor controller may provide three-phase, AC electric power to coils of the stator 320 via terminals of the terminal block assembly 327 (see FIGS. 3A-3C).

In another example, however, the motor controller or at least the inverter may be disposed within the assembly 200. In other words, the inverter can be integrated within the housing 300. Referring to FIG. 4C, for example, an inverter board (e.g., an inverter PCB) can be positioned in the space between the lower rotor clamping plate 326 and the cylindrical portions 308, 310 of the housing 300. This way, a separate housing for the motor controller might not be needed. Further, the heat generated from the motor controller (e.g., from the inverter board) during operation, is dissipated via the housing 300, thereby enhancing efficiency and power density of the electric motor 318.

Figure 5A:
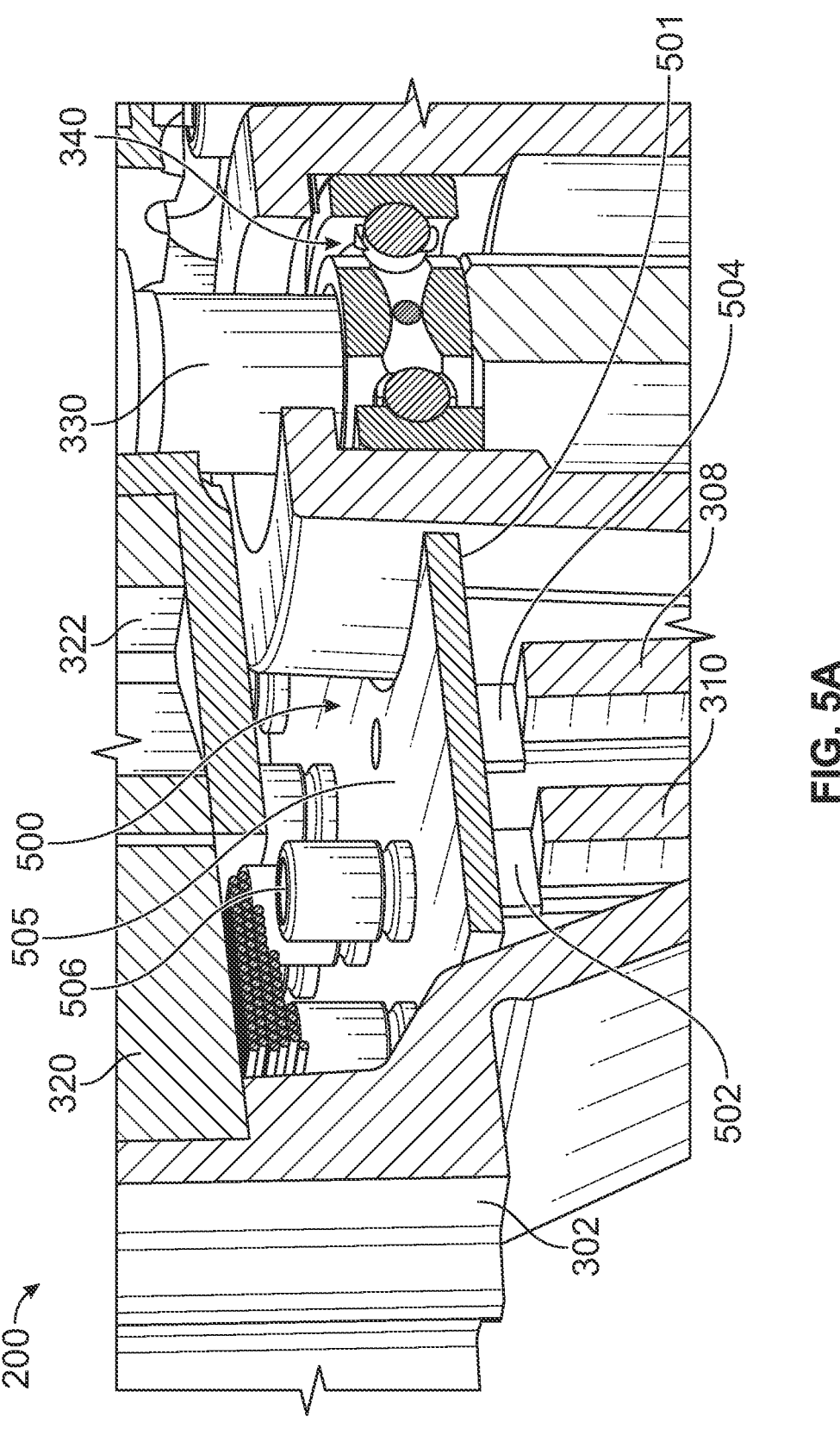
FIG. 5A illustrates a partial perspective cross-sectional view of the assembly of FIG. 3A with an embedded inverter board, in accordance with an example implementation.

FIG. 5A illustrates a partial perspective cross-sectional view of the assembly 200, in accordance with an example implementation. In the example implementation of FIG. 5A, the assembly 200 includes an inverter board 500 (e.g., a PCB). In an example, the inverter board 500 is ring-shaped. The inverter board 500 can be affixed within the housing 300 via a plurality of bolts.

The inverter board 500 can be configured as a power converter that converts DC power received via the terminal block assembly 327 to three-phase, AC power that can be provided to wire windings of the stator 320 to drive the electric motor 318. The inverter board 500 includes a semiconductor switching matrix mounted to a bottom surface 501 of the inverter board 500 and including a plurality of transistors, such as transistor 502, 504. The inverter board 500 can further include a plurality of capacitors mounted to a top surface 505 of the inverter board 500, opposite the bottom surface 501, such as capacitor 506.

In an example, the semiconductor switching matrix can include a three-phase, with bridge elements electrically coupled to input DC terminals (the terminals of the terminal block assembly 327) receiving voltage potential DC+ and voltage potential DC−. The transistors (e.g., the transistors 502, 504) can be Insulated Gate Bipolar Transistors or a metal-oxide-semiconductor field-effect transistor, for example. The transistors are switchable between an activated or "on" state and a deactivated or "off" state, e.g., via a PWM signal provided by a microprocessor of the motor controller.

As the transistors of the semiconductor switching matrix are activated and deactivated at particular times via the PWM signal, AC voltage waveforms are generated. As such, the AC voltage waveforms are pulse width modulated and swing between voltage potential DC+ and voltage potential DC−. The AC voltage waveforms are then provided to the wire windings of the stator 320 to drive current into the phases of the electric motor 318.

In an example, the transistors can be configured in circular arrays about the bottom surface 501 of the inverter board 500. The circular arrays of transistors can be concentric, and the outer circular array including the transistor 502 faces the cylindrical portion 310, whereas the inner circular array including the transistor 504 faces the cylindrical portion 308. During operation of the electric motor 318 and switching of the transistors of the inverter board 500, heat is generated from the transistors. With the configuration of FIG. 5A, the heat is transmitted to the cylindrical portions 308, 310, which are integral to the housing 300, and thus heat is dissipated through the housing 300.

In some examples, to enhance heat transfer from the transistors to the cylindrical portions 308, 310, a thermally-conductive substance can be placed between the transistors and the cylindrical portions 308, 310. Different types of thermally-conductive substances can be used. For example, the thermally conductive substance can take the form of a paste comprising a mineral oil with thermally-conductive solid particles (e.g., metallic material) suspended therein. In other examples, the thermally conductive substance can take the form of a thermally-conductive pad comprising a silicone polymer that is combined with a thermal medium (e.g., ceramic).

In an example, the thermally-conductive substance can include silicone grease or wax filled with a thermally-conductive material such as aluminum oxide. In another example, the thermally-conductive substance can include a cured, sheet-like material. Such material can be formed of a urethane binder, a curing agent, and one or more thermally-conductive fillers. The fillers, which may include aluminum oxide, aluminum nitride, boron nitride, magnesium oxide, or zinc oxide, for example.

In an example, the thermally-conductive substance can include phase-change materials, which can be self-supporting and form-stable at room temperature for ease of handling. Such phase-change materials can liquefy or otherwise soften at temperatures within the operating temperature range of the electric motor 318 to form a viscous, thixotropic phase. The phase-change materials, which can be supplied as free-standing films, or as heated screen printed onto a substrate surface, can operate as greases and waxes in conformably flowing within the operating temperature of the electric motor 318.

In another example, the thermally-conductive substance can include a tape or sheet comprising an inner and outer release liner and an interlayer of a thermal compound. One side of the tape or sheet can be coated with a thin layer of a pressure-sensitive adhesive (PSA) for the application of the material to the heat transfer surfaces between the transistors and the cylindrical portions 308, 310 of the housing 300.

In some examples, gels can be used as the thermally-conductive substance. Such gels may include systems based on silicones, i.e., polysiloxanes, such as polyorganosiloxane, as well as systems based on other polymers, which may be thermoplastic or thermosetting, such as polyurethanes, polyureas, fluoropolymers, chlorosulfonates, polybutadienes, butyls, neoprenes, nitrites, polyisoprenes, and buna-N, copolymers such as ethylene-propylene (EPR), styrene-isoprene-styrene (SIS), styrene-butadiene-styrene (SBS), ethylene-propylene-diene monomer (EPDM), nitrile butadiene (NBR), styrene-ethylene-butadiene (SEB), and styrene-butadiene (SBR), and blends thereof such as ethylene or propylene-EPDM, EPR, or NBR.

The inverter board 500 can be placed in other locations within the assembly 200 in other example implementations. For example, the inverter board 500 can be attached to the housing cover 316.

Figure 5B:
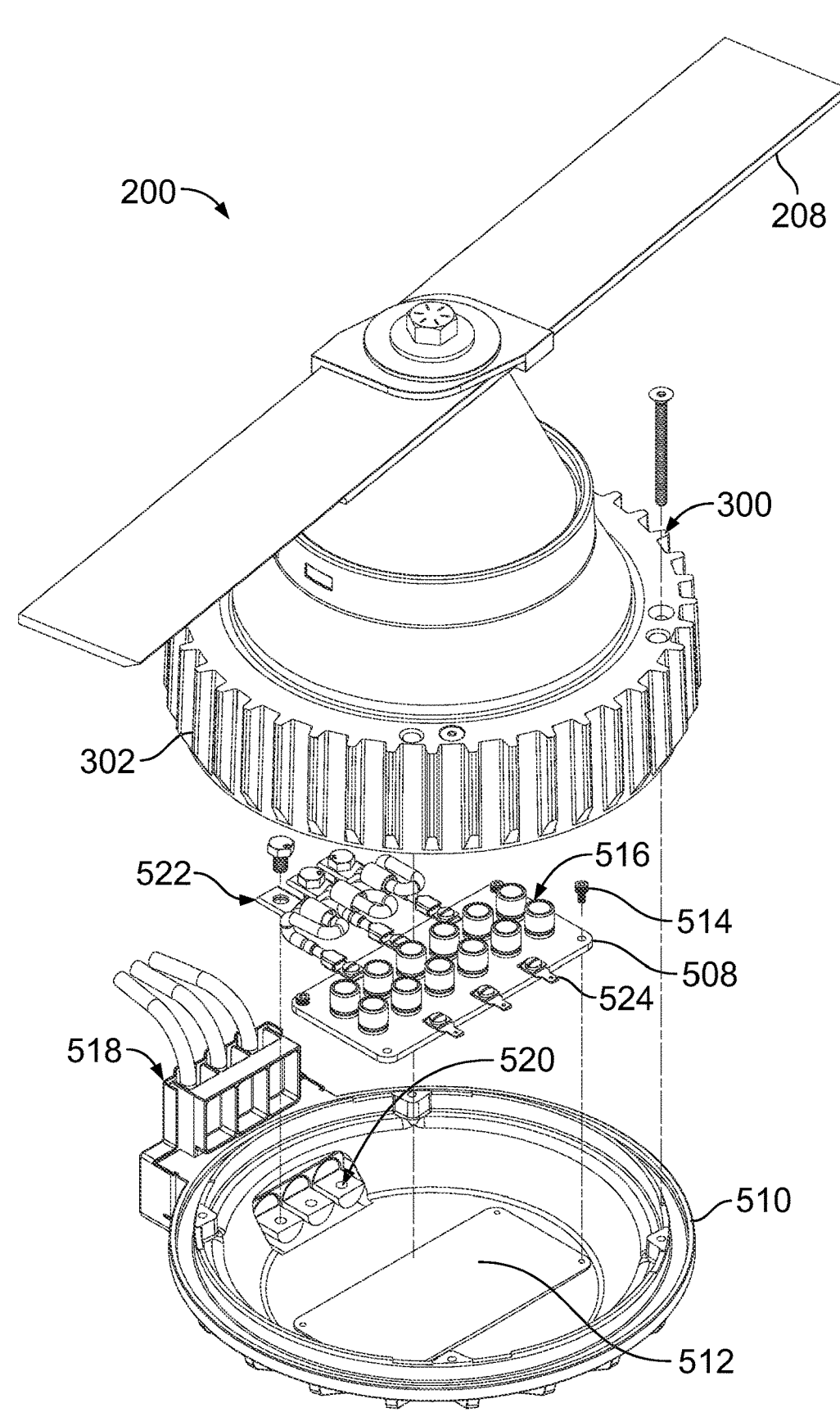
FIG. 5B illustrates an exploded perspective view of an assembly with an inverter board configured to be attached to a housing cover, in accordance with an example implementation
Figure 5C:
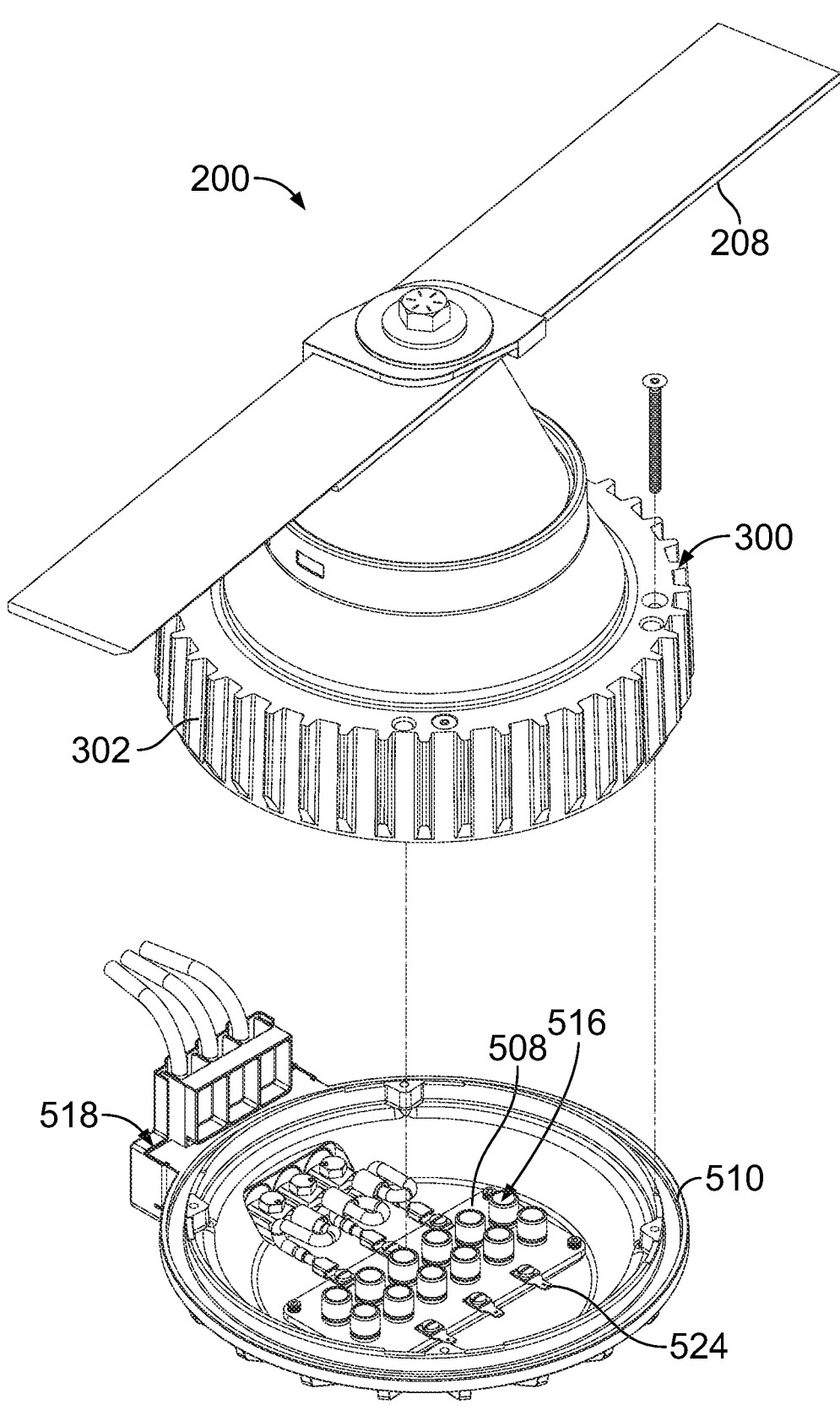
FIG. 5C illustrates another exploded perspective view of the assembly of FIG. 5B with the inverter board attached to the housing cover, in accordance with an example implementation.

FIG. 5B illustrates an exploded perspective view of the assembly 200 with an inverter board 508 configured to be attached to a housing cover 510, and FIG. 5C illustrates another exploded perspective view of the assembly 200 with the inverter board 508 attached to the housing cover 510, in accordance with an example implementation. FIGS. 5B-5C show the assembly 200 in a flipped (upside down) position to reveal attachment of the inverter board 508 to an interior surface of the housing cover 510.

As shown in the example implementation of FIGS. 5B-5C, the housing cover 510 can include a mounting plate 512 attached to an interior surface of the housing cover 510. The inverter board 508 is configured to be attached to the mounting plate 512, e.g., via fasteners such as fastener 514.

The inverter board 508 can include a plurality of capacitors 516 mounted to a bottom surface thereof, while a top surface of the inverter board 508 interfaces with and contacts the mounting plate 512. With this configuration, heat generated by the inverter board 508 during operation can be dissipated via the housing cover 510.

In the example implementation of FIGS. 5B-5C, rather than having the terminal block assembly 327 attached to the motor housing portion 302, a terminal block assembly 518 is coupled to the housing cover 510. The terminal block assembly 518 has terminals 520 protruding into the inner space of the housing cover 510.

Corresponding terminals 522 are connected to the inverter board 508. With this configuration, when the inverter board 508 is mounted to the housing cover 510 as shown in FIG. 5C, the terminals 520 contact the corresponding terminals 522 to facilitate providing DC power and a control signal from an external source through the terminal block assembly 518 to the inverter board 508, for example.

The inverter board 508 can also have a set of output terminals, such as output terminal 524. Wires or cables can be connected between the output terminals (e.g., the output terminal 524) and the wire windings of the stator 320 to provide three-phase AC power thereto.

Figure 5D:
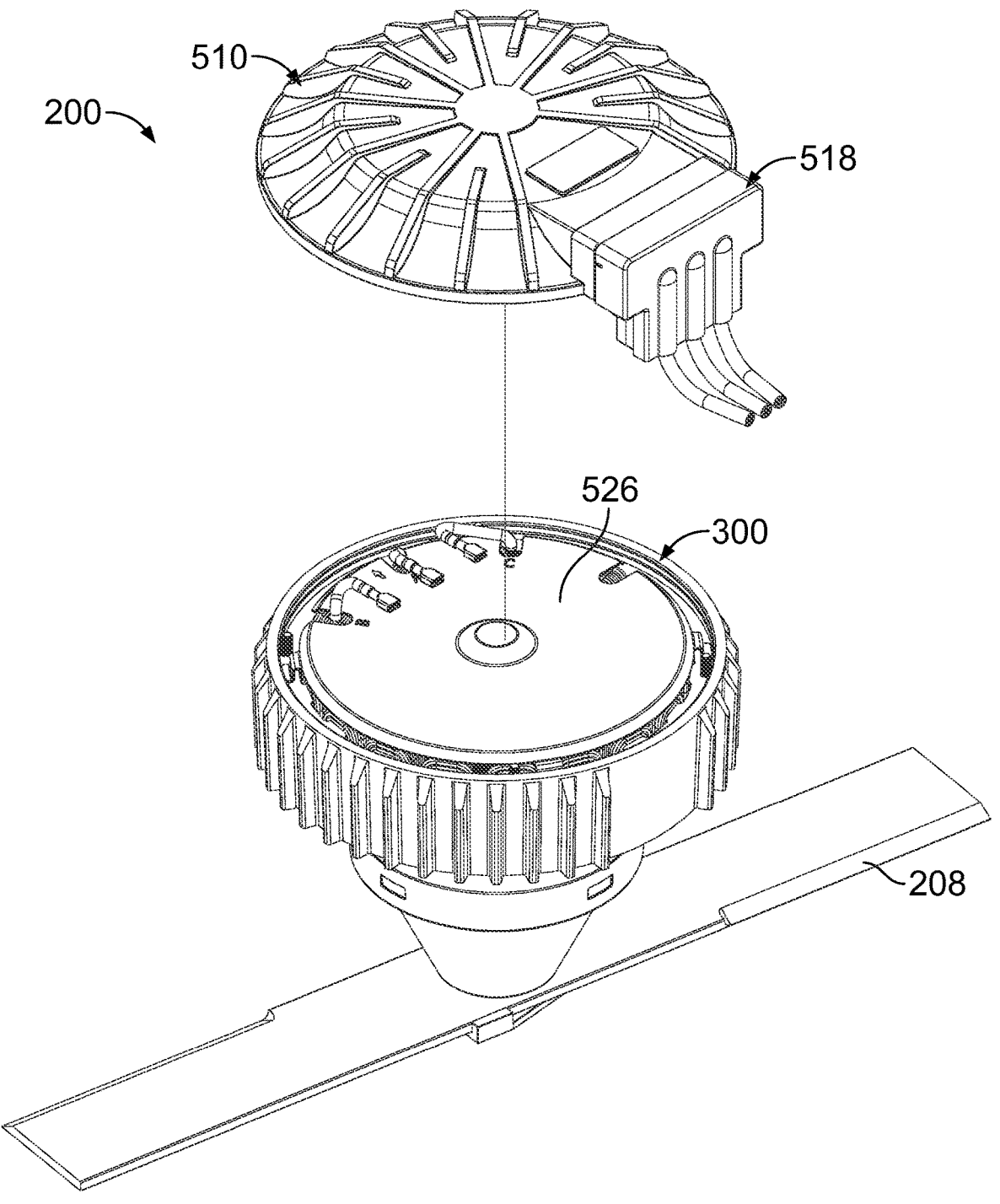
FIG. 5D illustrates an exploded perspective view of the assembly of FIGS. 5B-5C, in accordance with an example implementation.

FIG. 5D illustrates an exploded perspective view of the assembly 200 of FIGS. 5B-5C, in accordance with an example implementation. As shown, a guard plate 526 (e.g., made from plastic) can be mounted within the housing 300 to prevent wires, debris, etc. from interfering with the rotor 322. Cables such as cable 528 are connected to the wire windings of the stator 320, and extend through slots in the guard plate 526 to be also connected to the output terminals of the output terminals of the inverter board 508 when the housing cover 510 is mounted to the housing 300.

Whether the inverter board is disposed within the assembly 200 or external thereto, electric signals are provided to the assembly 200 via the terminals of the terminal block assembly 327 or the terminal block assembly 518. The terminal block assembly 327, 518 provides a cost-efficient, well-sealed assembly for providing electric signals or electric power to the assembly 200.

Figure 6A:
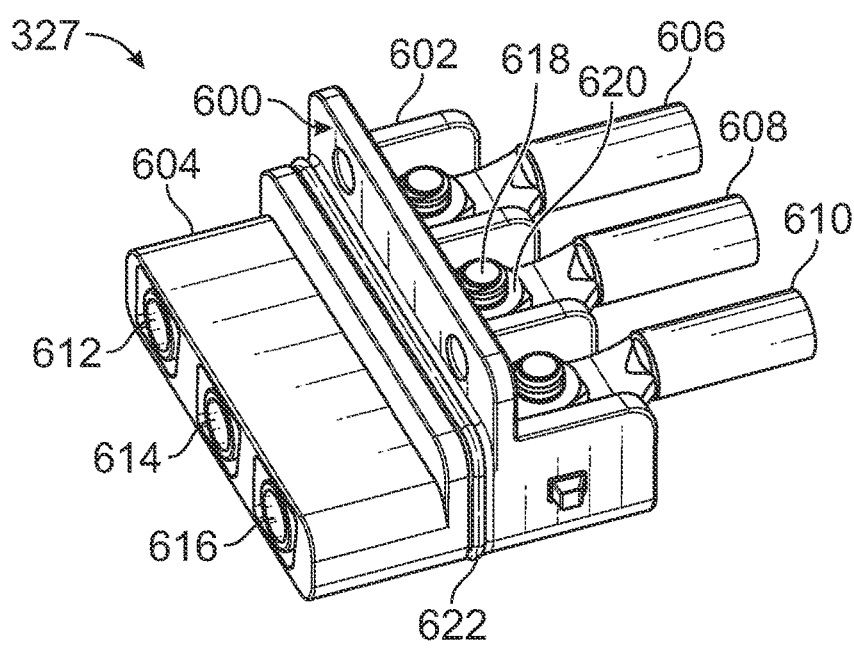
FIG. 6A illustrates a perspective view of a terminal block assembly, in accordance with an example implementation.
Figure 6B:
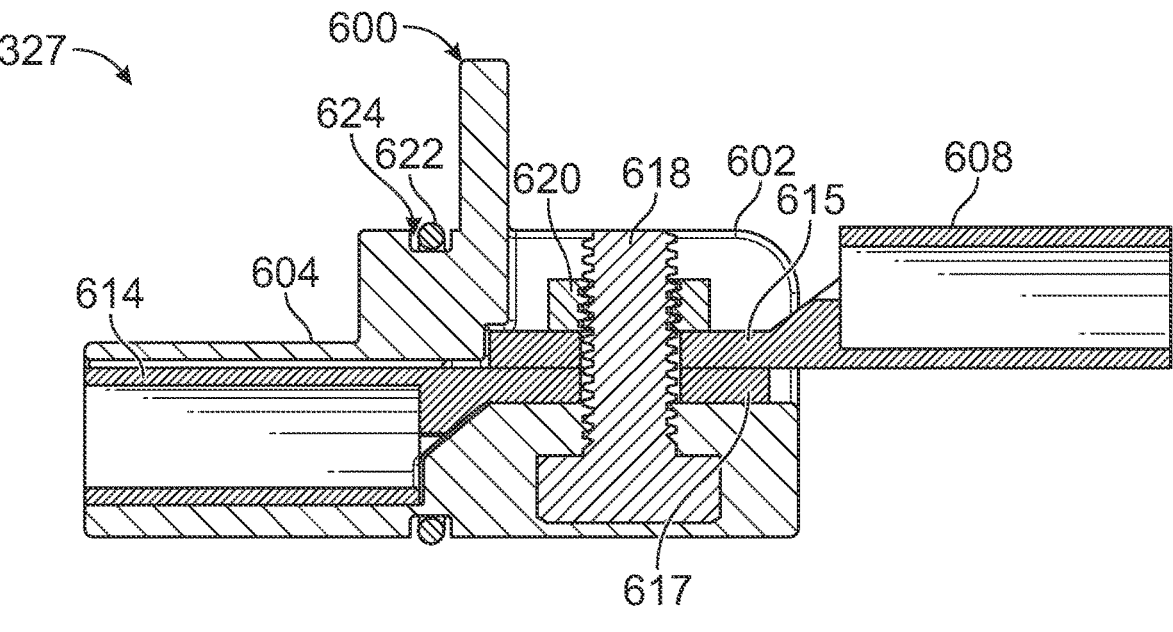
FIG. 6B illustrates a cross-sectional view of the terminal block assembly of FIG. 6A, in accordance with an example implementation.

FIG. 6A illustrates a perspective view of the terminal block assembly 327, and FIG. 6B illustrates a cross-sectional view of the terminal block assembly 327, in accordance with an example implementation. FIGS. 6A-6B are described together.

The terminal block assembly 327 has a terminal block housing 600 having an external housing portion 602 and an internal housing portion 604. The terminal block housing 600 can be made of rubber or plastic, as examples. The external housing portion 602 is disposed substantially outside the housing 300, and the internal housing portion 604 is disposed substantially inside the housing 300 (see FIG. 3B).

The terminal block assembly 327 has three input terminals coupled to the external housing portion 602, including input terminal 606, input terminal 608, and input terminal 610. The terminal block assembly 327 also has three output terminals coupled to the internal housing portion 604, including output terminal 612, output terminal 614, and output terminal 616. In the example implementation of FIGS. 6A-6B, the input terminals 606-610 and the output terminals 612-616 are represented as ring terminals as an example for illustration. Other types of terminals could be used.

The input terminals 606-610 are mechanically coupled respectively to the output terminals 612-616. For example, referring to FIG. 6B, a ring 615 of the input terminal 608 is mounted atop a respective ring 617 of the output terminal 614. A bolt 618 and a nut 620 are then used to couple the rings to each other, and thus mechanically couple the input terminal 608 to the output terminal 614. The input terminals 606, 610 are respectively coupled to the output terminals 612, 616 in a similar manner.

With this configuration, the input electrical signals (e.g., DC voltages, AC waveforms, a controller signal, etc.) provided to the input terminals 606-610 are conducted to the output terminals 612-616, which in turn are electrically coupled via wires or cables to the windings of the stator 320 and the inverter board 500 in the example implementation where the inverter board 500 is disposed within the housing 300.

Further, a seal 622 (e.g., a rectangular seal) can be position in a groove 624 formed in the terminal block housing 600 to seal the terminal block assembly 327 against the housing 300 and prevent any fluids or debris from entering the housing 300. Further, in an example, ports can be drilled in the terminal block housing 600 near the rings of the input terminals 606-610 and respective rings of the output terminals 612-616. Then, a liquid gasket can be poured inside the terminal block housing 600 near the rings through the ports to enhance sealing the terminal block assembly 327 and the terminals therein against the environment.

FIG. 7A illustrates a partial perspective view of the assembly 200 depicting a bottom portion thereof, and FIG. 7B illustrates a perspective cross-sectional view of the bottom portion of the assembly 200, in accordance with an example implementation. As shown, the mounting spacer 348 is disposed between the spindle 330 and the blade 208. The mounting spacer 348 is configured to determine the cutting depth of the blade 208.

Figure 8:
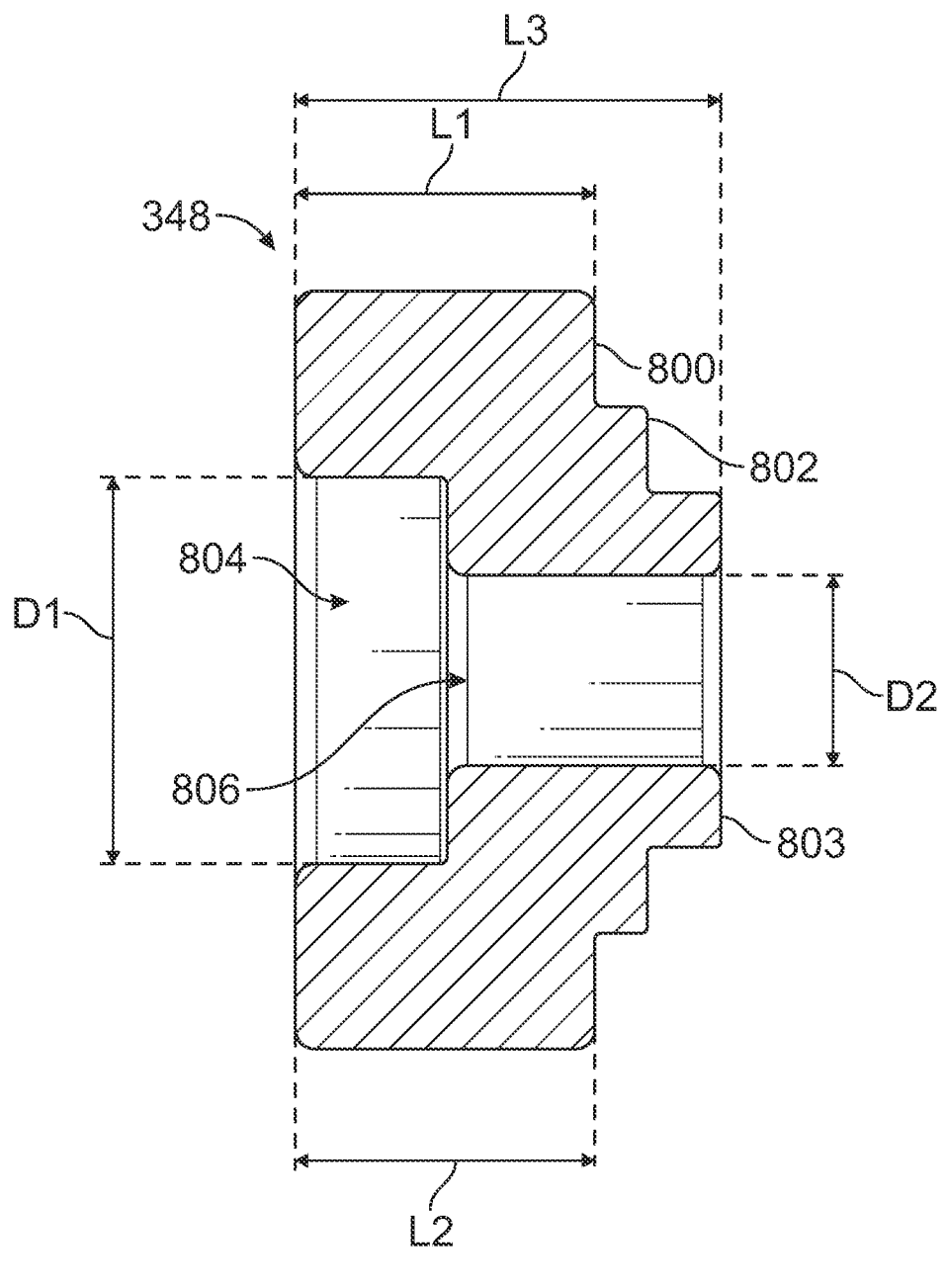
FIG. 8 illustrates a cross-sectional side view of a mounting spacer, in accordance with an example implementation.

FIG. 8 illustrates a cross-sectional side view of the mounting spacer 348, in accordance with an example implementation. The mounting spacer 348 is generally cylindrical in shape and has two steps formed by its exterior surface to form a first shoulder 800 and a second shoulder 802. Referring to FIGS. 7B, 8 together, the first shoulder 800 interfaces with the airflow cone 350, while the second shoulder 802 interface with the blade 208. A lower end 803 of the mounting spacer 348 interfaces with the blade adapter driver 358. The depth of the shoulders 800, 802 and the length of the mounting spacer 348 is determined by the lengths labelled as L1, L2, and L3 in FIG. 8.

The mounting spacer 348 is hollow, and its interior diameter changes along a length of the mounting spacer 348. Particularly, the mounting spacer 348 has a first cavity 804 having a first diameter D1 and a second cavity 806 having a second diameter D2. The first cavity 804 accommodates the spindle 330, and the second cavity 806 accommodates the screw 354.

The mounting spacer 348 can be changed to allow for position adjustment of the blade 208. Particularly, the dimensions L1, L2, and L3 can be adjusted to increase or decrease the position of the blade 208 relative to the assembly 200, and thus change the cutting depth of the mower 100. This way, the mounting spacer 348 is a variable blade adapter configured to allow positioning the blade at different cutting heights (e.g., different distances from ground). Advantageously, such adjustment to the positioning of the blade 208 is accomplished with minimal changes to the configuration of the assembly 200. Several mounting spacers with different dimensions can be made to accommodate different blade positions, and the mounting spacers can be changed readily without making major changes to the assembly 200.

Referring back to FIGS. 7A-7B, as mentioned above, in one example, the Bellville washer 352 can be configured to interface directly with the blade 208 and clamp the blade 208 against the mounting spacer 348 when the screw 354 is tightened such that the blade 208 rotates with the spindle 330 and the rotor 322. However, in other examples, it may be desirable to configure the assembly 200 such that if the blade 208 comes to a sudden stop (e.g., due to impact with foreign objects where the blade 208 is blocked by an obstacle such as a rock that precludes the blade 208 from rotating), the spindle 330 can continue to rotate to preclude damage to the electric motor 318. As such, the blade adapter 356 is configured as a breakaway feature that may allow the spindle 330 to continue rotating if the blade 208 is forced to a sudden stop.

Figures 9A, 9B, 10A, 10B:
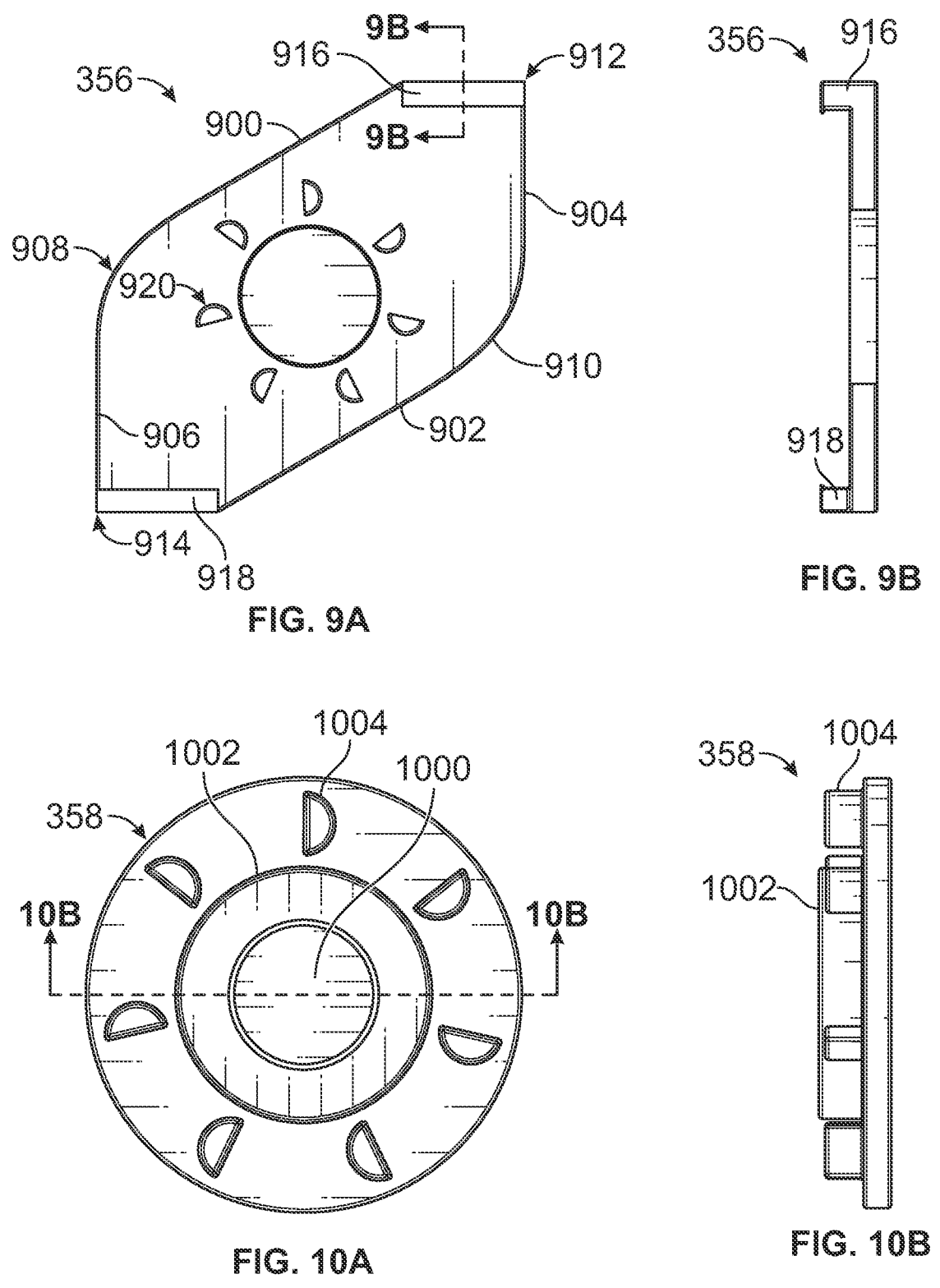

FIG. 9A illustrates a top view of the blade adapter 356, and FIG. 9B illustrates a side view of the blade adapter 356, in accordance with an example implementation. The blade adapter 356 can be made of a plastic material, for example.

The blade adapter 356 is generally formed as a parallelogram with four sides, each two opposing sides being generally parallel to each other. Particularly, the blade adapter 356 has a first side 900, a second side 902, a third side 904, and a fourth side 906, where the first side 900 and the second side are opposite and parallel to each other, and the third side 904 and the fourth side 906 are opposite and parallel to each other.

A first corner 908 between the first side and the fourth side is filleted or curved, and a second corner 910 between the second side 902 and the third side 904 is also curved. A third corner 912 and a fourth corner 914 of the blade adapter 356 are generally sharp corners.

The blade adapter 356 further includes a first arm or first receptacle 916 at the third corner 912. The first receptacle 916 protrudes upward and is configured to wrap partially around the blade 208 as shown in FIG. 7A. Similarly, the blade adapter 356 includes a second arm or second receptacle 918 at the fourth corner 914, and the second receptacle 918 protrudes upward and is configured to wrap partially around the blade 208 as shown in FIG. 7A. The receptacles 916, 918 operate as rails or channels (e.g., C-shaped channels) that receive the blade 208 and retain the blade 208 to the blade adapter 356.

The blade adapter 356 has a plurality of holes, such as hole 920, shaped as half-moons. The plurality of half-moon holes form a circular array about the blade adapter 356. The half-moon holes can be through-holes, for example. These holes facilitate rotatably engaging the blade adapter 356 to the blade adapter driver 358.

FIG. 10A illustrates a top view of the blade adapter driver 358, and FIG. 10B illustrates a side view of the blade adapter driver 358, in accordance with an example implementation. The blade adapter driver 358 is generally formed as a flange and has a central hole 1000 to accommodate the screw 354 therethrough.

The blade adapter driver 358 further has a hub 1002 that interfaces with the lower end 803 of the mounting spacer 348. The blade adapter driver 358 further has a plurality of protrusions or teeth, such as tooth 1004, shaped as half-moons. The plurality of half-moon teeth of the blade adapter driver 358 form a circular array about the blade adapter driver 358 and correspond to the plurality of holes (e.g., the hole 920) of the blade adapter 356.

The teeth of the blade adapter driver 358 are configured to be inserted into the holes of the blade adapter 356 such that the blade adapter driver 358 rotatably engages the blade adapter 356. In other words, the blade adapter driver 358 operates as a gear that is configured to engage the blade adapter 356 and rotate it. The half-moon shapes of the holes of the blade adapter 356 and the teeth of the blade adapter driver 358 is an example for illustration. Other shapes could be used (e.g., the teeth could have other prismatic shapes and the holes could have corresponding shapes to accommodate the teeth therethrough).

Referring back to FIG. 7B, as the spindle 330 rotates with the rotor 322 of the electric motor 318, the screw 354 rotates therewith. The screw 354 clamps the Bellville washer 352 against the blade adapter driver 358, and thus the blade adapter driver 358 rotates with the screw 354. The blade adapter driver 358 in turn drives (i.e., rotates) the blade adapter 356 due to engagement of the teeth of the blade adapter driver 358 with the holes of the blade adapter 356.

As the blade adapter 356 rotates, the receptacles 916, 918 rotate the blade 208 therewith. Notably, with this configuration, the blade 208 is not substantially clamped against the mounting spacer 348. In other words, torque is not transmitted from the mounting spacer 348 to the blade 208. Rather, the blade adapter 356 transmits torque to and rotates the blade 208.

As mentioned above, in one example, the blade adapter 356 can be made of plastic material. In this example, the blade adapter 356 can be configured such that if the blade 208 comes to a sudden stop (e.g., due to impact with an obstacle), the blade 208 can break the receptacles 916, 918 such that the spindle 330 and the rotor 322 of the electric motor 318 can continue rotating while the blade 208 remains stopped. This way, when the blade 208 is stopped suddenly, causing the torque applied to the spindle 330 to exceed a particular torque level, the blade adapter 356 is configured as a breakaway feature that allows the spindle 330 to break way and continue rotating. This configuration may reduce the likelihood of damage to the electric motor 318.

In an example, rather than making the blade adapter 356 or the receptacles 916, 918 out of a breakable material, such as plastic, an alternative blade adapter such as the blade adapter 360 (shown in FIG. 3C) made of sheet metal could be used. The blade adapter 360 has a generally similar shape as the blade adapter 356 but is made of sheet metal such that its receptacles are bendable as opposed to being breakable.

Figure 11:
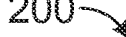
FIG. 11 illustrates a bottom perspective view of the assembly of FIG. 3A with an alternative blade adapter and an alternative blade adapter driver, in accordance with an example implementation.
Figure 11:
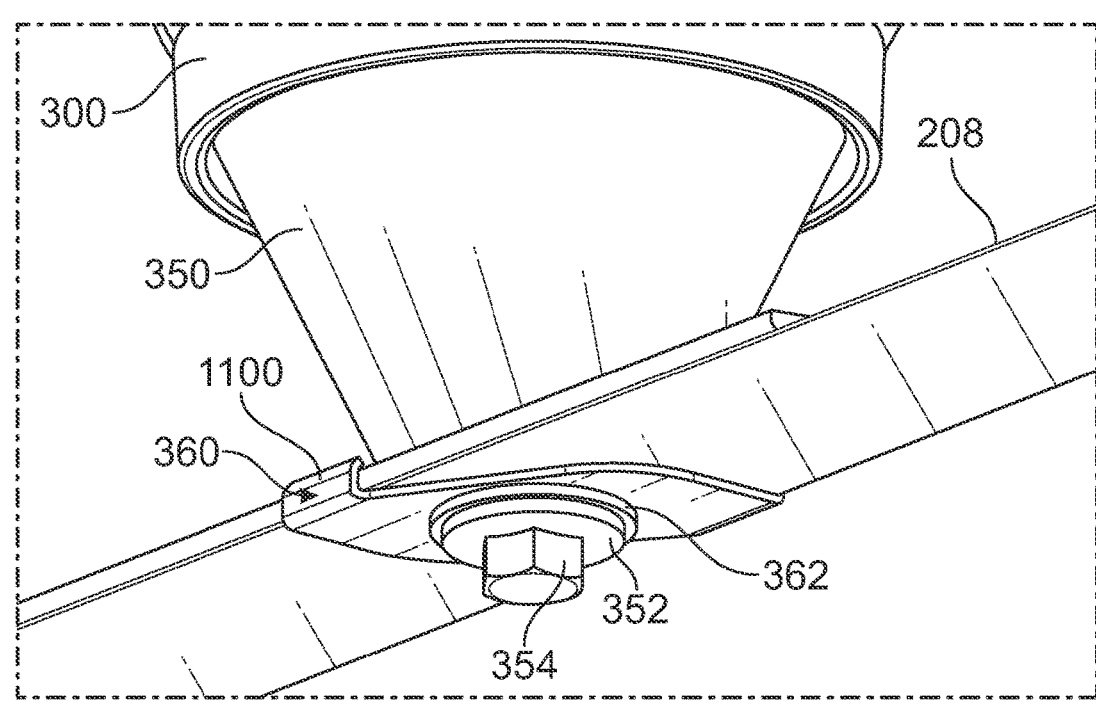

FIG. 11 illustrates a bottom perspective view of the assembly 200 with the blade adapter 360 and the blade adapter driver 362, in accordance with an example implementation. As depicted, the blade adapter 360 can be thinner compared to the blade adapter 356. The blade adapter 360 can have receptacles such as a receptacle 1100 that is similar to the receptacles 916, 918 in that the receptacle 1100 is formed as a rail that wraps partially around the blade 208 (e.g., forms a C-shaped channel).

The blade adapter driver 362 is similar to the blade adapter driver 358 but may be adapted to the blade adapter 360 being thinner and made of sheet metal. For example, the blade adapter driver 362 can also be made thinner compared to the blade adapter driver 358 and its teeth may be made shorter compared to the teeth of the blade adapter driver 358.

Similar to the blade adapter 356, the blade adapter 360 causes the blade 208 to rotate via receptacles (e.g., the receptacle 1100). If the blade 208 is forced into a sudden stop, the receptacle 1100 may bend as opposed to break. Particularly, the receptacle 1100 may be bent to the extent that it clears the blade 208 to allow the spindle to continue rotating while the blade 208 is stopped.

As such, the assembly 200 can be configured to include a breakaway feature or configuration that allows the rotor 322 to keep rotating if the blade 208 is forced into ta sudden stop. Other breakaway mechanisms or configurations could be used. For example, a clutch or a brake configuration that can maintain engagement of the blade 208 with the spindle 330 until torque exceeds a threshold torque value could be used. Any other friction device that slips once a max torque value is reached by use of one or more bushings or a mechanical slip joint like a mildly self-holding taper interface could be used. In another example, a sacrificial material connection between the rotor 322 and the spindle 330 could be used. In this example, a Woodruff key, a similar soft material mechanical link, or an engineered weak spot in the "coupling" can be configured to break under high load. The sacrificial part can be replaceable by the operator.

In the description above and FIGS. 2A-11, the assembly 200 is described as driving the blade 208 of the mower deck 104 of the mower 100, as an example. The assembly 200 can drive other functions such as brush function, vacuum function, a pump, a wheel of the mower 100, etc. In these examples, orientation of the assembly 200 may change. Thus, the terms "upper" or "top" and "lower" or "bottom" may be changed to "first" and "second" or "proximal" and "distal" based on the orientation of the assembly 200.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiment (EEEs) listed below.

EEE 1 is an assembly comprising: a housing having a motor housing portion and a spindle housing portion, wherein the spindle housing portion comprises a central tube; an electric motor disposed within the motor housing portion of the housing, wherein the electric motor has a rotor; a spindle coupled to the rotor of the electric motor, wherein the spindle is disposed within the central tube of the spindle housing portion; and one or more bearings disposed within the central tube and supporting the spindle.

EEE 2 is the assembly of EEE 1, further comprising: a mounting spacer mounted about the spindle and configured to determine a position of a blade to be coupled to the assembly.

EEE 3 is the assembly of any of EEEs 1-2, wherein the housing comprises one or more conical sections connecting the motor housing portion to the spindle housing portion.

EEE 4 is the assembly of any of EEEs 1-3, wherein the one or more bearings comprise: a first bearing mounted at a first end of the spindle within the central tube; and a second bearing mounted at a second end of the spindle within the central tube.

EEE 5 is the assembly of EEE 4, further comprising: a wave spring mounted within the central tube and applying a biasing force on an outer race of the first bearing; and a retaining ring interfacing with the second bearing and configured to retain the spindle, the first bearing, and the second bearing within the central tube.

EEE 6 is the assembly of any of EEEs 4-5, further comprising: an airflow cone mounted about a portion of the central tube and configured to rotate with the spindle, while protecting the second bearing from debris.

EEE 7 is the assembly of any of EEEs 1-6, further comprising: an inverter board, wherein the inverter board is: mounted within the housing, wherein the inverter board comprises a plurality of transistors mounted to a first surface of the inverter board, and a plurality of capacitors mounted to a second surface of the inverter board opposite the first surface; or attached to a housing cover mounted to the housing to form an enclosure in which the electric motor is disposed.

EEE 8 is the assembly of EEE 7, wherein the housing further comprises one or more cylindrical portions inside the housing, wherein the plurality of transistors interface with the one or more cylindrical portions to transfer heat from the plurality of transistors to the housing.

EEE 9 is the assembly of any of EEEs 1-8, wherein the electric motor further comprises a stator mounted within the housing, wherein the rotor is mounted within the stator, wherein the stator interfaces with a shoulder formed within the housing to transfer heat from the stator to the housing.

EEE 10 is the assembly of EEE 9, further comprising: a housing cover mounted to the housing to form an enclosure in which the electric motor is disposed, wherein the housing cover comprises one or more arcuate protrusions interfacing with the stator to transfer heat from the stator to the housing cover.

EEE 11 is the assembly of any of EEEs 1-10, wherein the rotor of the electric motor comprises (i) a rotor lamination stack comprising a plurality of laminations, each lamination comprising a central ring and a plurality of petals emanating radially outward from the central ring, and (ii) a plurality of magnets disposed in a spoke arrangement between respective petals of the plurality of petals, and wherein the assembly further comprises: a rotor clamping plate interfacing with the rotor lamination stack; and a plurality of screws coupling the rotor clamping plate to the rotor lamination stack, wherein a screw of the plurality of screws is disposed at a magnetically-neutral position equidistant from two adjacent magnets of the plurality of magnets.

EEE 12 is the assembly of EEE 11, wherein the rotor clamping plate comprise a hub having an internal taper, wherein the spindle comprises a tapered end received within and complies to the internal taper of the hub, such that the tapered end of the spindle and the internal taper of the hub form a self-holding taper arrangement for transmitting torque from the hub to the spindle.

EEE 13 is the assembly of any of EEEs 1-12, further comprising: a terminal block assembly comprising: a terminal block housing having (i) an external housing portion disposed substantially outside the housing of the assembly, and (ii) an internal housing portion disposed substantially inside the housing of the assembly, wherein the external housing portion comprises a plurality of input terminals, and wherein the internal housing portion comprises a plurality of output terminals respectively coupled to the plurality of input terminals; and a seal positioned in a groove formed in the terminal block housing to seal the terminal block assembly against the housing of the assembly.

EEE 14 is the assembly of any of EEEs 1-13, wherein the spindle is configured to drive a blade, and wherein the assembly further comprises: a breakaway configuration, wherein as the blade is forced into a sudden stop, causing a torque exceeding a threshold torque to be applied to the spindle, the breakaway configuration allows the rotor of the electric motor and the spindle coupled thereto to continue rotating.

EEE 15 is the assembly of EEE 14, wherein the breakaway configuration comprises: a blade adapter driver configured to rotate with the spindle, wherein the blade adapter driver comprises a plurality of teeth; and a blade adapter having a plurality of holes respectively receiving the plurality of teeth of the blade adapter driver, thereby causing the blade adapter driver to rotate the blade adapter, wherein the blade adapter further comprises one or more receptacles configured to receive the blade, such that the one or more receptacles cause the blade to rotate with the blade adapter, and wherein the one or more receptacles are configured to break or bend to allow the spindle to continue rotating as the blade is forced into the sudden stop.

EEE 16 is the assembly of EEE 15, further comprising: a Bellville washer interfacing with the blade adapter driver; and a screw that is threadedly engaged with the spindle to rotate therewith, wherein the screw clamps the Bellville washer against the blade adapter driver, causing the blade adapter driver to rotate with the spindle.

EEE 17 is a mower comprising: a source of electric power; a mower deck; and one or more assemblies mounted to the mower deck and coupled to respective blades, wherein an assembly of the one or more assemblies comprises: a housing having a motor housing portion and a spindle housing portion, wherein the spindle housing portion comprises a central tube, an electric motor disposed within the motor housing portion of the housing, wherein the electric motor has a stator and a rotor, wherein the source of electric power is configured to provide electric power to wire windings of the stator, a spindle coupled to the rotor of the electric motor, wherein the spindle is disposed within the central tube of the spindle housing portion, wherein the spindle is configured to drive a blade of the respective blades, and one or more bearings disposed within the central tube and supporting the spindle.

EEE 18 is the mower of EEE 17, wherein the assembly further comprises: a mounting spacer mounted about the spindle and configured to position of a blade associated with a distance of the blade from ground.

EEE 19 is the mower of any of EEEs 17-18, wherein the assembly further comprises: a breakaway configuration, wherein as the blade is forced into a sudden stop, causing a torque exceeding a threshold torque to be applied to the spindle, the breakaway configuration allows the rotor of the electric motor and the spindle coupled thereto to continue rotating.

EEE 20 is the assembly of EEE 19, wherein the breakaway configuration comprises: a blade adapter driver configured to rotate with the spindle, wherein the blade adapter driver comprises a plurality of teeth; and a blade adapter having a plurality of holes respectively receiving the plurality of teeth of the blade adapter driver, thereby causing the blade adapter driver to rotate the blade adapter, wherein the blade adapter further comprises one or more receptacles configured to receive the blade, such that the one or more receptacles cause the blade to rotate with the blade adapter, and wherein the one or more receptacles are configured to break or bend to allow the spindle to continue rotating as the blade is forced into the sudden stop.

What is claimed is:

1. An assembly comprising:
a housing having a motor housing portion and a spindle housing portion, wherein the spindle housing portion comprises a central tube;
an electric motor disposed within the motor housing portion of the housing, wherein the electric motor has a rotor;
a spindle coupled to the rotor of the electric motor, wherein the spindle is disposed within the central tube of the spindle housing portion;
one or more bearings disposed within the central tube and supporting the spindle; and
an inverter board, wherein the inverter board is: mounted within the housing, wherein the inverter board comprises a plurality of transistors mounted to a first surface of the inverter board, and a plurality of capacitors mounted to a second surface of the inverter board opposite the first surface, or attached to a housing cover mounted to the housing to form an enclosure in which the electric motor is disposed.

2. The assembly of claim 1, further comprising:
a mounting spacer mounted about the spindle and configured to determine a position of a blade to be coupled to the assembly.

3. The assembly of claim 1, wherein the housing comprises one or more conical sections connecting the motor housing portion to the spindle housing portion.

4. The assembly of claim 1, wherein the housing further comprises one or more cylindrical portions inside the housing, wherein the plurality of transistors interface with the one or more cylindrical portions to transfer heat from the plurality of transistors to the housing.

5. The assembly of claim 1, wherein the electric motor further comprises a stator mounted within the housing, wherein the rotor is mounted within the stator, wherein the stator interfaces with a shoulder formed within the housing to transfer heat from the stator to the housing.

6. The assembly of claim 5, further comprising:
a housing cover mounted to the housing to form an enclosure in which the electric motor is disposed, wherein the housing cover comprises one or more arcuate protrusions interfacing with the stator to transfer heat from the stator to the housing cover.

7. The assembly of claim 1, further comprising:
a terminal block assembly comprising:
a terminal block housing having (i) an external housing portion disposed substantially outside the housing of the assembly, and (ii) an internal housing portion disposed substantially inside the housing of the assembly, wherein the external housing portion comprises a plurality of input terminals, and wherein the internal housing portion comprises a plurality of output terminals respectively coupled to the plurality of input terminals; and
a seal positioned in a groove formed in the terminal block housing to seal the terminal block assembly against the housing of the assembly.

8. The assembly of claim 1, wherein the spindle is configured to drive a blade, and wherein the assembly further comprises:
a breakaway configuration, wherein as the blade is forced into a sudden stop, causing a torque exceeding a threshold torque to be applied to the spindle, the breakaway configuration allows the rotor of the electric motor and the spindle coupled thereto to continue rotating.

9. The assembly of claim 8, wherein the breakaway configuration comprises:
a blade adapter driver configured to rotate with the spindle, wherein the blade adapter driver comprises a plurality of teeth; and
a blade adapter having a plurality of holes respectively receiving the plurality of teeth of the blade adapter driver, thereby causing the blade adapter driver to rotate the blade adapter, wherein the blade adapter further comprises one or more receptacles configured to receive the blade, such that the one or more receptacles cause the blade to rotate with the blade adapter, and wherein the one or more receptacles are configured to break or bend to allow the spindle to continue rotating as the blade is forced into the sudden stop.

10. The assembly of claim 9, further comprising:
a conical spring washer interfacing with the blade adapter driver; and
a screw that is threadedly engaged with the spindle to rotate therewith, wherein the screw clamps the conical spring washer against the blade adapter driver, causing the blade adapter driver to rotate with the spindle.

11. An assembly comprising:

a housing having a motor housing portion and a spindle housing portion, wherein the spindle housing portion comprises a central tube;

an electric motor disposed within the motor housing portion of the housing, wherein the electric motor has a rotor disposed inside a stator;

a spindle coupled to the rotor of the electric motor, wherein the spindle is disposed within the central tube of the spindle housing portion; and one or more bearings disposed within the central tube and supporting the spindle, wherein the one or more bearings comprise: a first bearing mounted at a first end of the spindle within the central tube under the electric motor, and a second bearing mounted at a second end of the spindle within the central tube.

12. The assembly of claim 11, further comprising:

a wave spring mounted within the central tube and applying a biasing force on an outer race of the first bearing; and a retaining ring interfacing with the second bearing and configured to retain the spindle, the first bearing, and the second bearing within the central tube.

13. The assembly of claim 11, further comprising:

an airflow cone mounted about a portion of the central tube and configured to rotate with the spindle, while protecting the second bearing from debris.

14. An assembly comprising:

a housing having a motor housing portion and a spindle housing portion, wherein the spindle housing portion comprises a central tube;

an electric motor disposed within the motor housing portion of the housing, wherein the electric motor has a rotor, wherein the rotor of the electric motor comprises (i) a rotor lamination stack comprising a plurality of laminations, each lamination comprising a central ring and a plurality of petals emanating radially outward from the central ring, and (ii) a plurality of magnets disposed in a spoke arrangement between respective petals of the plurality of petals;

a rotor clamping plate interfacing with the rotor lamination stack;

a plurality of screws coupling the rotor clamping plate to the rotor lamination stack, wherein a screw of the plurality of screws is disposed at a magnetically-neutral position equidistant from two adjacent magnets of the plurality of magnets; and a spindle coupled to the rotor of the electric motor, wherein the spindle is disposed within the central tube of the spindle housing portion.

15. The assembly of claim 14, wherein the rotor clamping plate comprise a hub having an internal taper, wherein the spindle comprises a tapered end received within and complies to the internal taper of the hub, such that the tapered end of the spindle and the internal taper of the hub form a self-holding taper arrangement for transmitting torque from the hub to the spindle.

16. A mower comprising:

a source of electric power;

a mower deck; and one or more assemblies mounted to the mower deck and coupled to respective blades, wherein an assembly of the one or more assemblies comprises:

a housing having a motor housing portion and a spindle housing portion, wherein the spindle housing portion comprises a central tube, an electric motor disposed within the motor housing portion of the housing, wherein the electric motor has a stator and a rotor, wherein the source of electric power is configured to provide electric power to wire windings of the stator, a spindle coupled to the rotor of the electric motor, wherein the spindle is disposed within the central tube of the spindle housing portion, wherein the spindle is configured to drive a blade of the respective blades, one or more bearings disposed within the central tube and supporting the spindle, and a breakaway configuration comprising: (i) a blade adapter driver configured to rotate with the spindle, wherein the blade adapter driver comprises a plurality of teeth; and (ii) a blade adapter having a plurality of holes respectively receiving the plurality of teeth of the blade adapter driver, thereby causing the blade adapter driver to rotate the blade adapter, wherein the blade adapter further comprises one or more receptacles configured to receive the blade, such that the one or more receptacles cause the blade to rotate with the blade adapter, and wherein the one or more receptacles are configured to break or bend to allow the spindle to continue rotating as the blade is forced into a sudden stop.

17. The mower of claim 16, wherein the assembly further comprises:

a mounting spacer mounted about the spindle and configured to determine position of a blade associated with a distance of the blade from ground.

* * * * *